United States Patent
Liu et al.

(10) Patent No.: US 11,252,410 B2
(45) Date of Patent: Feb. 15, 2022

(54) METHOD AND APPARATUS FOR VIDEO CODING

(71) Applicant: TENCENT AMERICA LLC, Palo Alto, CA (US)

(72) Inventors: Shan Liu, San Jose, CA (US); Xin Zhao, Santa Clara, CA (US); Xiang Li, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/878,390

(22) Filed: May 19, 2020

(65) Prior Publication Data

US 2020/0396455 A1 Dec. 17, 2020

Related U.S. Application Data

(60) Provisional application No. 62/860,149, filed on Jun. 11, 2019.

(51) Int. Cl.
| | |
|---|---|
| *H04N 19/00* | (2014.01) |
| *H04N 19/122* | (2014.01) |
| *H04N 19/70* | (2014.01) |
| *H04N 19/196* | (2014.01) |
| *H04N 19/61* | (2014.01) |
| *H04N 19/176* | (2014.01) |
| *H04N 19/159* | (2014.01) |

(52) U.S. Cl.
CPC ......... *H04N 19/122* (2014.11); *H04N 19/159* (2014.11); *H04N 19/176* (2014.11); *H04N 19/196* (2014.11); *H04N 19/61* (2014.11); *H04N 19/70* (2014.11)

(58) Field of Classification Search
CPC .................................................... H04N 19/00
See application file for complete search history.

(56) References Cited

U.S. PATENT DOCUMENTS

| | | | |
|---|---|---|---|
| 2010/0086049 A1 | 4/2010 | Ye et al. | |
| 2013/0094572 A1* | 4/2013 | Van der Auwera .. | H04N 19/126 375/240.03 |
| 2017/0094313 A1* | 3/2017 | Zhao ..................... | H04N 19/159 |
| 2019/0020886 A1 | 1/2019 | Hannuksela et al. | |
| 2020/0296370 A1* | 9/2020 | Egilmez ............... | H04N 19/625 |

OTHER PUBLICATIONS

International Search Report and Written Opinion dated Jul. 31, 2020 in International Application No. PCT/US20/34271. 15 pgs.

* cited by examiner

*Primary Examiner* — Maryam A Nasri
(74) *Attorney, Agent, or Firm* — Oblon, McClelland, Maier & Neustadt, L.L.P.

(57) ABSTRACT

In a method of video decoding at a video decoder, a first high level syntax (HLS) element and a second HLS element can be received. The first HLS element can indicate whether an explicit multiple transform selection (MTS) is enabled or disabled for an intra coded block. The second HLS element can indicate whether the explicit MTS is enabled or disabled for an inter coded block. The first and second HLS elements can control a same set of coding blocks that include the intra coded block and the inter coded block. An implicit MTS can be enabled for the intra coded block when the first HLS element indicates the explicit MTS is disabled for the intra coded block, and the second HLS element indicates the explicit MTS is enabled for the inter coded block.

20 Claims, 39 Drawing Sheets

4x4 transform

8x8 transform

16x16 transform

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

Continue from FIG. 13B

Continue from FIG. 13D

FIG. 13E

Transform basis functions of DCT-2, DST-7 and DCT-8 for N-point input

| Transform Type | Basis function $T_i(j)$, $i,j=0, 1,\ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i=0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

*FIG. 14*

| mts_idx | Transform Type Horizontal | Transform type Vertical |   |
|---|---|---|---|
| −1 | 0 | 0 | 1501 |
| 0 | 1 | 1 | 1502 |
| 1 | 2 | 1 | 1503 |
| 2 | 1 | 2 | 1504 |
| 3 | 2 | 2 | 1505 |

Transform Type
0 – DCT2
1 – DST7
2 – DCT8

*FIG. 15*

4-point DST-7:

{ a, b, c, d }
{ c, c, 0, -c }
{ d, -a, -c, b }
{ b, -d, c, -a } where {a, b, c, d} = { 29, 55, 74, 84 }

FIG. 16A

8-point DST-7:

{ a, b, c, d, e, f, g, h }
{ c, f, h, e, b, -a, -d, -g }
{ e, g, b, -c, -h, -d, a, f }
{ g, c, -d, -f, a, h, b, -e }
{ h, -a, -g, b, f, -c, -e, d }
{ f, -e, -a, g, -d, -b, h, -c }
{ d, -h, e, a, -f, g, -c, -b }
{ b, -d, f, -h, g, -e, c, -a } where {a, b, c, d, e, f, g, h} = { 17, 32, 46, 60, 71, 78, 85, 86 }

FIG. 16B

16-point DST-7:

{ a, b, c, d, e, f, g, h, i, j, k, l, m, n, o, p }
{ c, f, i, l, o, p, m, j, g, d, a, -b, -e, -h, -k, -n }
{ e, j, o, m, h, c, -b, -g, -l, -p, -k, -f, -a, d, i, n }
{ g, n, l, e, -b, -i, -p, -j, -c, d, k, o, h, a, -f, -m }
{ i, o, f, -c, -l, -l, -c, f, o, i, 0, -i, -o, -f, c, l }
{ k, j, a, -l, -i, b, m, h, -c, -n, -g, d, o, f, -e, -p }
{ m, f, -g, -l, a, n, e, -h, -k, b, o, d, -i, -j, c, p }
{ o, b, -m, -d, k, f, -i, -h, g, j, -e, -l, c, n, -a, -p }
{ p, -b, -n, d, l, -f, -j, h, h, -j, -f, l, d, -n, -b, p }
{ n, -f, -h, l, a, -p, e, i, -k, -c, o, -d, -j, j, c, -o }
{ l, -j, -b, n, -h, -d, p, -f, -f, p, -d, -h, n, -b, -j, l }
{ j, -n, d, f, -p, h, b, -l, l, -b, -h, p, -f, -d, n, -j }
{ h, -p, j, -a, -g, o, -k, b, f, -n, l, -c, -e, m, -m, d }
{ f, -l, p, -j, d, b, -h, n, -n, h, -b, -d, j, -p, l, -f }
{ d, -h, l, -p, m, -i, e, -a, -c, g, -k, o, -n, j, -f, b }
{ b, -d, f, -h, j, -l, n, -p, o, -m, k, -i, g, -e, c, -a } where {a, b, c, d, e, f, g, h, i, j, k, l, m, n, o, p} = { 9, 17, 25, 33, 41, 49, 56, 62, 66, 72, 77, 81, 83, 87, 89, 90 }

FIG. 16C

32-point DST-7 where {a, b, c, d, e, f, g, h, i, j, k, l, m, n, o, p, q, r, s, t, u, v, w, x, y, z, A, B, C, D, E, F} = { 4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90 }

4-point DCT-8:

{ a,  b,  c,  d,}
{ b,  0, -b, -d,}
{ c, -b, -a,  a,}
{ d, -b,  a, -c,} where {a, b, c, d} = { 84, 74, 55, 29}

FIG. 17A

8-point DCT-8:

{ a,  b,  c,  d,  e,  f,  g,  h,}
{ b,  e,  h, -g, -d, -a, -c, -f,}
{ c,  h, -e, -a, -f,  g,  b,  d,}
{ d, -g, -a, -h,  c,  b,  f, -e,}
{ e, -d, -f,  c,  g, -b, -h,  a,}
{ f, -a,  g,  b, -b, -h, -d,  c,}
{ g, -c,  b, -f, -h,  d, -e, -b,}
{ h, -f,  d, -b,  a, -c,  e, -g,} where {a, b, c, d, e, f, g, h} = { 86, 85, 78, 71, 60, 46, 32, 17}

FIG. 17B

16-point DCT-8:

{ a,  b,  c,  d,  e,  f,  g,  h,  i,  j,  k,  l,  m,  n,  o,  p,}
{ b,  e,  h,  k,  n, -p, -m, -j, -g, -d, -a, -c, -f, -i, -l, -o,}
{ c,  h,  m, -o, -j, -e, -a, -f, -k, -p,  l,  g,  b,  d,  i,  n,}
{ d,  k, -o, -h, -a, -g, -n,  l,  e,  b,  j,  m, -i, -c, -f, -m,}
{ e,  n, -j, -a, -i,  o,  d,  f, -m, -k, -b, -h,  p,  c,  g, -l,}
{ f, -p, -e, -g,  o,  d,  h, -n, -c, -i,  m,  b,  j, -l, -a, -k,}
{ g, -m, -a, -n,  f,  h, -l, -b, -o,  e,  i, -k, -c, -p,  d,  j,}
{ h, -j, -f,  l,  d, -n, -b,  p,  a,  o, -c, -m,  e,  k, -g, -i,}
{ i, -g, -k,  e,  m, -c, -o,  a, -p, -b,  n,  d, -l, -f,  j,  h,}
{ j, -d, -p,  b,  k, -i, -e,  o, -c, -l,  h,  f, -n,  a,  m, -g,}
{ k, -a,  l,  j, -b,  m,  i, -c,  n,  h, -d,  o,  g, -e,  p,  f,}
{ l, -c,  g, -p, -h,  b, -k, -m,  d, -f,  o,  i, -a,  j,  n, -e,}
{ m, -f,  b, -i,  p,  j, -c,  e, -l, -n,  g, -a,  h, -o, -k,  d,}
{ n, -i,  d, -c,  h, -m, -o,  j, -e,  b, -g,  l,  p, -k,  f, -a,}
{ o, -l,  i, -f,  c, -a,  d, -g,  j, -m,  p,  n, -k,  h, -e,  b,}
{ p, -o,  n, -m,  l, -k,  j, -i,  h, -g,  f, -e,  d, -c,  b, -a,} where {a, b, c, d, e, f, g, h, i, j, k, l, m, n, o, p} = { 90, 89, 87, 83, 81, 77, 72, 66, 62, 56, 49, 41, 33, 25, 17, 9}

| seq_parameter_set_rbsp( ) { | Descriptor |
|---|---|
| ...... | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| ...... | |

FIG. 18

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

Mapping from intra prediction mode to transform set index

| | Descriptor |
|---|---|
| coding_unit( x0, y0, cbWidth, cbHeight, treeType ) { | |
| ...... | |
|   numSigCoeff = 0 | |
|   numZeroOutSigCoeff = 0 | |
|   transform_tree( x0, y0, cbWidth, cbHeight, treeType ) | |
|   lfnstWidth = ( treeType == DUAL_TREE_CHROMA ) ? cbWidth / SubWidthC : cbWidth | |
|   lfnstHeight = ( treeType == DUAL_TREE_CHROMA ) ? cbHeight / SubHeightC : cbHeight | |
|   if( Min( lfnstWidth, lfnstHeight ) >= 4 && sps_lfnst_enabled_flag == 1 && <br>     CuPredMode[ x0 ][ y0 ] == MODE_INTRA && <br>     IntraSubPartitionsSplitType == ISP_NO_SPLIT && <br>     intra_mip_flag[ x0 ][ y0 ] ) { | |
|     if( ( numSigCoeff > ( ( treeType == SINGLE_TREE ) ? 2 : 1 ) ) && <br>       numZeroOutSigCoeff == 0 ) | |
|       lfnst_idx[ x0 ][ y0 ] | ae(v) |
|   } | |
|   } | |
| ...... | |

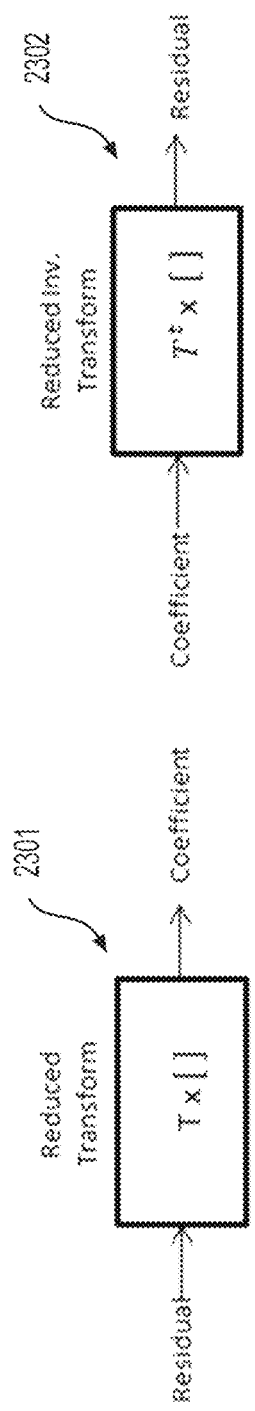
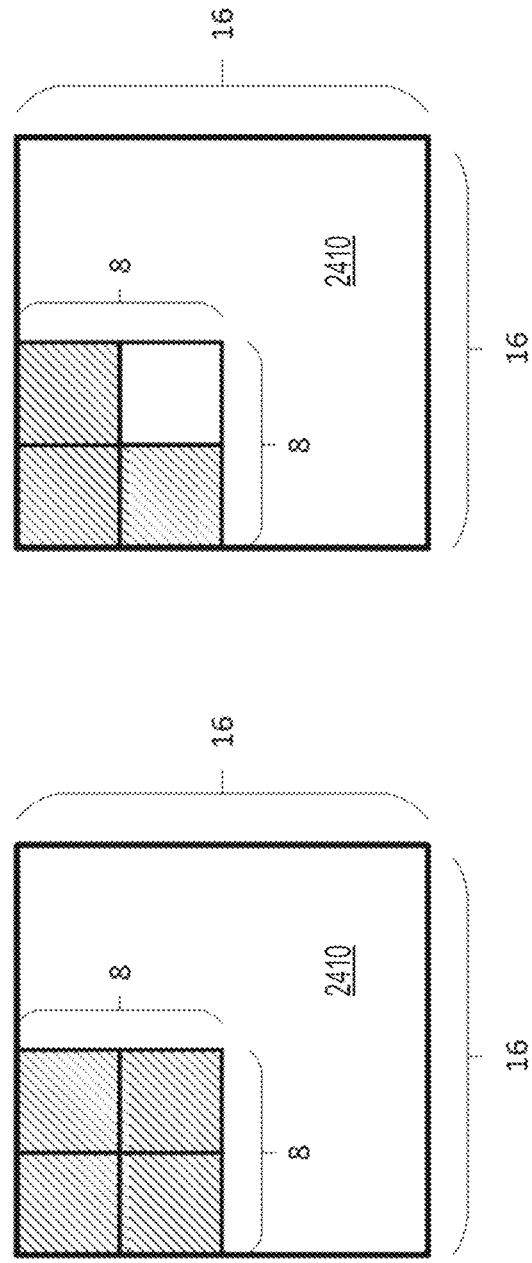
Forward and Inverse Reduced Transform
FIG. 23
FIG. 24A
FIG. 24B

Transform Set Selection Table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

*FIG. 25*

| coding_unit( x0, y0, cbWidth, cbHeight, treeType ) { | Descriptor |
|---|---|
| ...... | |
|     if( sps_mip_enabled_flag && <br>      ( Abs( Log2( cbWidth ) − Log2( cbHeight ) ) <= 2 ) && <br>      cbWidth <= MaxTbSizeY && cbHeight <= MaxTbSizeY ) | |
|       intra_mip_flag[ x0 ][ y0 ] | ae(v) |
|     if( intra_mip_flag[ x0 ][ y0 ] ) { | |
|       intra_mip_mpm_flag[ x0 ][ y0 ] | ae(v) |
|     if( intra_mip_mpm_flag[ x0 ][ y0 ] ) | |
|       intra_mip_mpm_idx[ x0 ][ y0 ] | ae(v) |
|     else | |
|       intra_mip_mpm_remainder[ x0 ][ y0 ] | ae(v) |
|     } else { | |
|       if( sps_mrl_enabled_flag && ( ( y0 % CtbSizeY ) > 0 ) ) | |
|         intra_luma_ref_idx[ x0 ][ y0 ] | ae(v) |
|       if( sps_isp_enabled_flag && intra_luma_ref_idx[ x0 ][ y0 ] = = 0 && <br>        ( cbWidth <= MaxTbSizeY && cbHeight <= MaxTbSizeY ) && <br>        ( cbWidth * cbHeight > MinTbSizeY * MinTbSizeY ) ) | |
|         intra_subpartitions_mode_flag[ x0 ][ y0 ] | ae(v) |
|       if( intra_subpartitions_mode_flag[ x0 ][ y0 ] = = 1 && <br>        cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 && <br>        intra_subpartitions_mode_flag[ x0 ][ y0 ] = = 0 ) | |
|         intra_luma_mpm_flag[ x0 ][ y0 ] | ae(v) |
|       if( intra_luma_mpm_flag[ x0 ][ y0 ] ) { | |
|         if( intra_luma_ref_idx[ x0 ][ y0 ] = = 0 ) | |
|           intra_luma_not_planar_flag[ x0 ][ y0 ] | ae(v) |
|         if( intra_luma_not_planar_flag[ x0 ][ y0 ] ) | |
|           intra_luma_mpm_idx[ x0 ][ y0 ] | ae(v) |
|       } else | |
|         intra_luma_mpm_remainder[ x0 ][ y0 ] | ae(v) |
|       } | |
|     } | |
|   } | |
| ...... | |

General

2801

Inputs to this process are:

- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

......

The variable implicitMtsEnabled is derived as follows:

- If sps_mts_enabled_flag is equal to 1 and one of the following conditions is true, implicitMtsEnabled is set equal to 1:
- IntraSubPartitionsSplitType is not equal to ISP_NO_SPLIT
- cu_sbt_flag is equal to 1 and Max( nTbW, nTbH ) is less than or equal to 32
- sps_explicit_mts_intra_enabled_flag and sps_explicit_mts_inter_enabled_flag are both equal to 0 and CuPredMode[ xTbY ][ yTbY ] is equal to MODE_INTRA.
- Otherwise, implicitMtsEnabled is set equal to 0.

Continue from FIG. 28A

2803

The variable trTypeHor specifying the horizontal transform kernel and the variable trTypeVer specifying the vertical transform kernel are derived as follows:

– If cIdx is greater than 0, trTypeHor and trTypeVer are set equal to 0.

– Otherwise, if implicitMtsEnabled is equal to 1, the following applies:

– If IntraSubPartitionsSplitType is not equal to ISP_NO_SPLIT or both sps_explicit_mts_intra_enabled_flag and sps_explicit_mts_inter_enabled_flag are equal to 0 and CuPredMode[ xTbY ][ yTbY ] is equal to MODE_INTRA, trTypeHor and trTypeVer are derived as follows:

trTypeHor = ( nTbW >= 4 && nTbW <= 16 ) ? 1 : 0    (3-1)

trTypeVer = ( nTbH >= 4 && nTbH <= 16 ) ? 1 : 0    (3-2)

– Otherwise (cu_sbt_flag is equal to 1), trTypeHor and trTypeVer are specified in Table II depending on cu_sbt_horizontal_flag and cu_sbt_pos_flag.

– Otherwise, trTypeHor and trTypeVer are specified in Table I depending on tu_mts_idx[ xTbY ][ yTbY ].

Table I – Specification of trTypeHor and trTypeVer depending on tu_mts_idx[ x ][ y ]

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

2804

Table II – Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

The variable implicitMtsEnabled is derived as follows:
- If sps_mts_enabled_flag is equal to 1 and one of the following conditions is true, implicitMtsEnabled is set equal to 1:
- IntraSubPartitionsSplitType is not equal to ISP_NO_SPLIT
- cu_sbt_flag is equal to 1 and Max( nTbW, nTbH ) is less than or equal to 32
- sps_explicit_mts_intra_enabled_flag and sps_explicit_mts_inter_enabled_flag are both is equal to 0 and CuPredMode[ xTbY ][ yTbY ] is equal to MODE_INTRA.
- Otherwise, implicitMtsEnabled is set equal to 0.

FIG. 29

The variable implicitMtsEnabled is derived as follows:
- If sps_mts_enabled_flag is equal to 1 and one of the following conditions is true, implicitMtsEnabled is set equal to 1:
- IntraSubPartitionsSplitType is not equal to ISP_NO_SPLIT
- cu_sbt_flag is equal to 1 and Max( nTbW, nTbH ) is less than or equal to 32
- sps_explicit_mts_intra_enabled_flag and sps_explicit_mts_inter_enabled_flag are both equal to 0 and CuPredMode[ xTbY ][ yTbY ] is equal to MODE_INTRA and sps_ifnst_enabled_flag is equal to 0.
- Otherwise, implicitMtsEnabled is set equal to 0.

FIG. 30

The variable implicitMtsEnabled is derived as follows:

– If sps_mts_enabled_flag is equal to 1 and one of the following conditions is true, implicitMtsEnabled is set equal to 1:

– IntraSubPartitionsSplitType is not equal to ISP_NO_SPLIT

– cu_sbt_flag is equal to 1 and Max( nTbW, nTbH ) is less than or equal to 32

– sps_explicit_mts_intra_enabled_flag and sps_explicit_mts_inter_enabled_flag are both equal to 0 and CuPredMode[ xTbY ][ yTbY ] is equal to MODE_INTRA and sps_mip_enabled_flag is equal to 0

– Otherwise, implicitMtsEnabled is set equal to 0.

FIG. 31

The variable implicitMtsEnabled is derived as follows:

– If sps_mts_enabled_flag is equal to 1 and one of the following conditions is true, implicitMtsEnabled is set equal to 1:

– IntraSubPartitionsSplitType is not equal to ISP_NO_SPLIT

– cu_sbt_flag is equal to 1 and Max( nTbW, nTbH ) is less than or equal to 32

– ~~sps_explicit_mts_intra_enabled_flag and sps_explicit_mts_inter_enabled_flag are both equal to 0 and CuPredMode[ xTbY ][ yTbY ] is equal to MODE_INTRA~~

– tu_mts_idx[ x0 ][ y0 ] and tflast_idx[ x0 ][ y0 ] are both equal to 0.

– Otherwise, implicitMtsEnabled is set equal to 0.

FIG. 32

The variable implicitMtsEnabled is derived as follows:
- If sps_mts_enabled_flag is equal to 1 and one of the following conditions is true, implicitMtsEnabled is set equal to 1:
- IntraSubPartitionsSplitType is not equal to ISP_NO_SPLIT
- cu_sbt_flag is equal to 1 and Max( nTbW, nTbH ) is less than or equal to 32
- ~~sps_explicit_mts_intra_enabled_flag and sps_explicit_mts_inter_enabled_flag are both equal to 0 and CuPredMode[ xTbY ][ yTbY ] is equal to MODE_INTRA~~
- tu_mts_idx[ x0 ][ y0 ], intra_mip_flag[ x0 ][ y0 ] and lfnst_idx[ x0 ][ y0 ] are all equal to 0.
- Otherwise, implicitMtsEnabled is set equal to 0.

FIG. 33

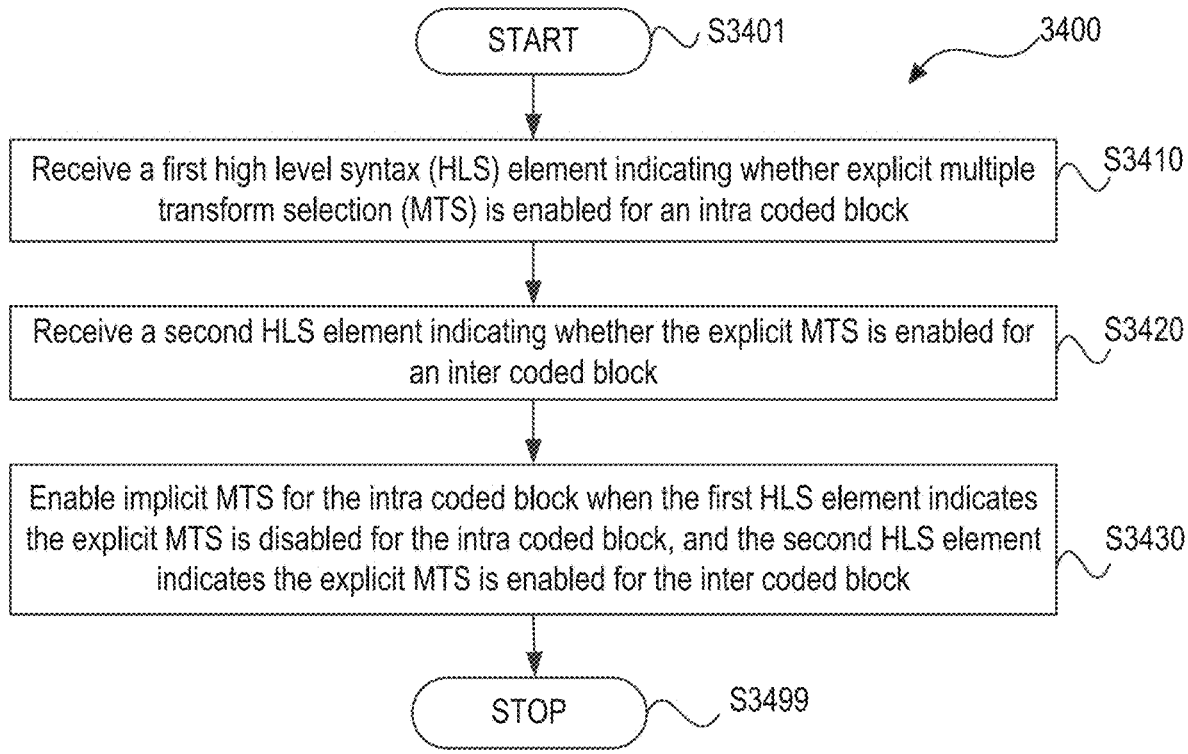

FIG. 34

METHOD AND APPARATUS FOR VIDEO CODING

INCORPORATION BY REFERENCE

This present application claims the benefit of priority to U.S. Provisional Application No. 62/860,149, "High-level Syntax Control on Enabling Implicit Transform Selection" filed on Jun. 11, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide a first method of video decoding at a video decoder. The method can include receiving a first high level syntax (HLS) element indicating whether an explicit multiple transform selection (MTS) is enabled or disabled for an intra coded block, and receiving a second HLS element indicating whether the explicit MTS is enabled or disabled for an inter coded block. The first and second HLS elements control a same set of coding blocks that include the intra coded block and the inter coded block. An implicit MTS can be enabled for the intra coded block when the first HLS element indicates the explicit MTS is disabled for the intra coded block, and the second HLS element indicates the explicit MTS is enabled for the inter coded block.

An embodiment of the method may further include applying the implicit MTS to the intra coded block. A transform type for processing the intra coded block can be determined according to a size of the intra coded block. In various examples, the first or second HLS element can be one of a video parameter set (VPS) syntax element, a sequence parameter set (SPS) syntax element, a picture parameter set (PPS) syntax element, a slice header syntax element, a tile header syntax element, or a tile group header syntax element. In an embodiment, the intra coded block is not coded with an intra sub-partitioning (ISP) mode. In an embodiment, the method can further include receiving a third HLS element indicating an MTS is enabled for each of the inter and intra coded blocks.

Aspects of the disclosure provide a second method of video decoding at a video decoder. The second method can include receiving a first HLS element indicating whether an MTS is enabled or disabled for an intra coded block, and receiving a second HLS element indicating whether a non-separable secondary transform (NSST) or matrix-based intra prediction (MIP) is disabled or enabled for the intra coded block. An implicit MTS can be enabled for the intra coded block when the first HLS element indicates the explicit MTS is disabled for the intra coded block, and the second HLS element indicates the NSST or the MIP is disabled for the intra coded block.

The disclosure can also provide a third method of video decoding at a video decoder. The third method can include receiving an intra coded block associated with a first block level syntax element indicating whether an MTS is applied, and a second block level syntax element indicating whether an NSST is applied. An implicit MTS can be enabled for the intra coded block when the first block level syntax element indicates the MTS is not applied, and the second block level syntax element indicates the NSST is not applied.

Note that although the instant application refers to NSST, the disclosed methods and systems can be applied to variants of NSST, such as, reduced size transform (RST), and low-frequency non-separable secondary transform (LFNST). Thus, NSST, RST, and/or LFNST can be used interchangeably throughout the instant application.

BRIEF DESCRIPTION OF THE DRAWINGS

Further features, the nature, and various advantages of the disclosed subject matter will be more apparent from the following detailed description and the accompanying drawings in which:

Figures 8A, 8B, 8C:
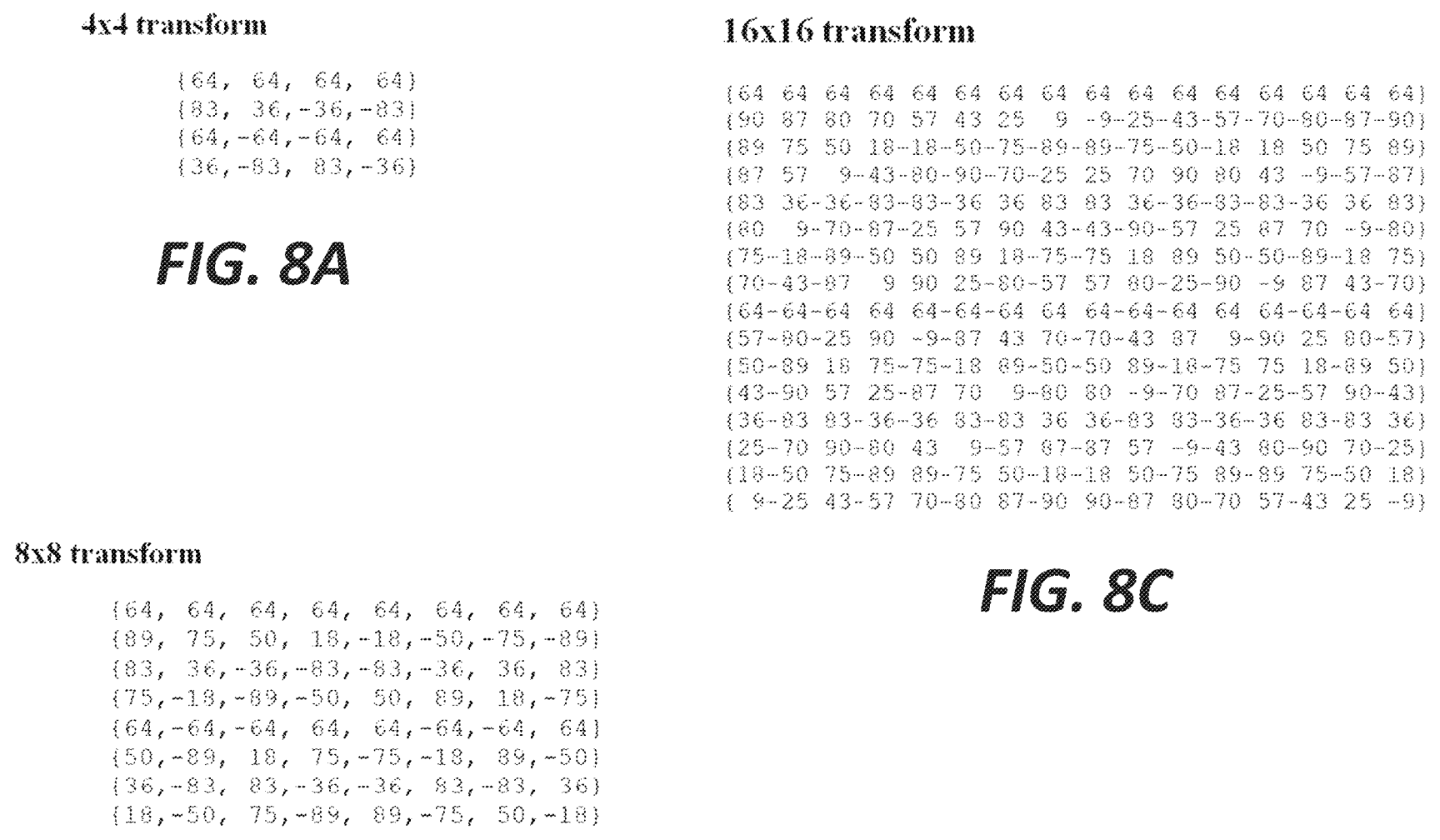
Figure 8D:
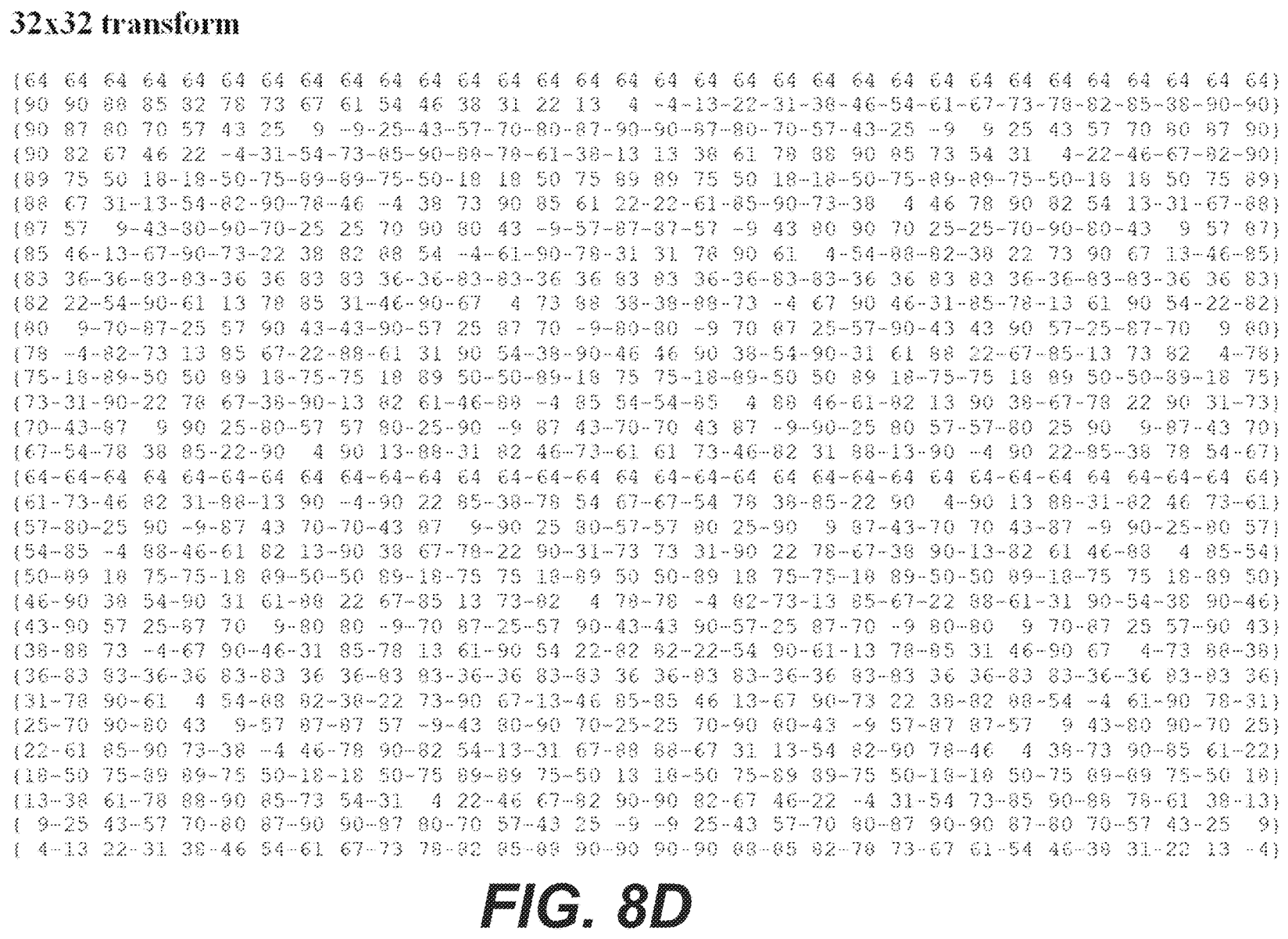

FIGS. 8A-8D show example transform core matrices of 4-point, 8-point, 16-point, and 32-point DCT-2, respectively, according to an embodiment.

FIG. 10 shows numbers of sub-partitions depending on the block size in an intra sub-partition (ISP) coding mode according to an embodiment.

Figure 13A:
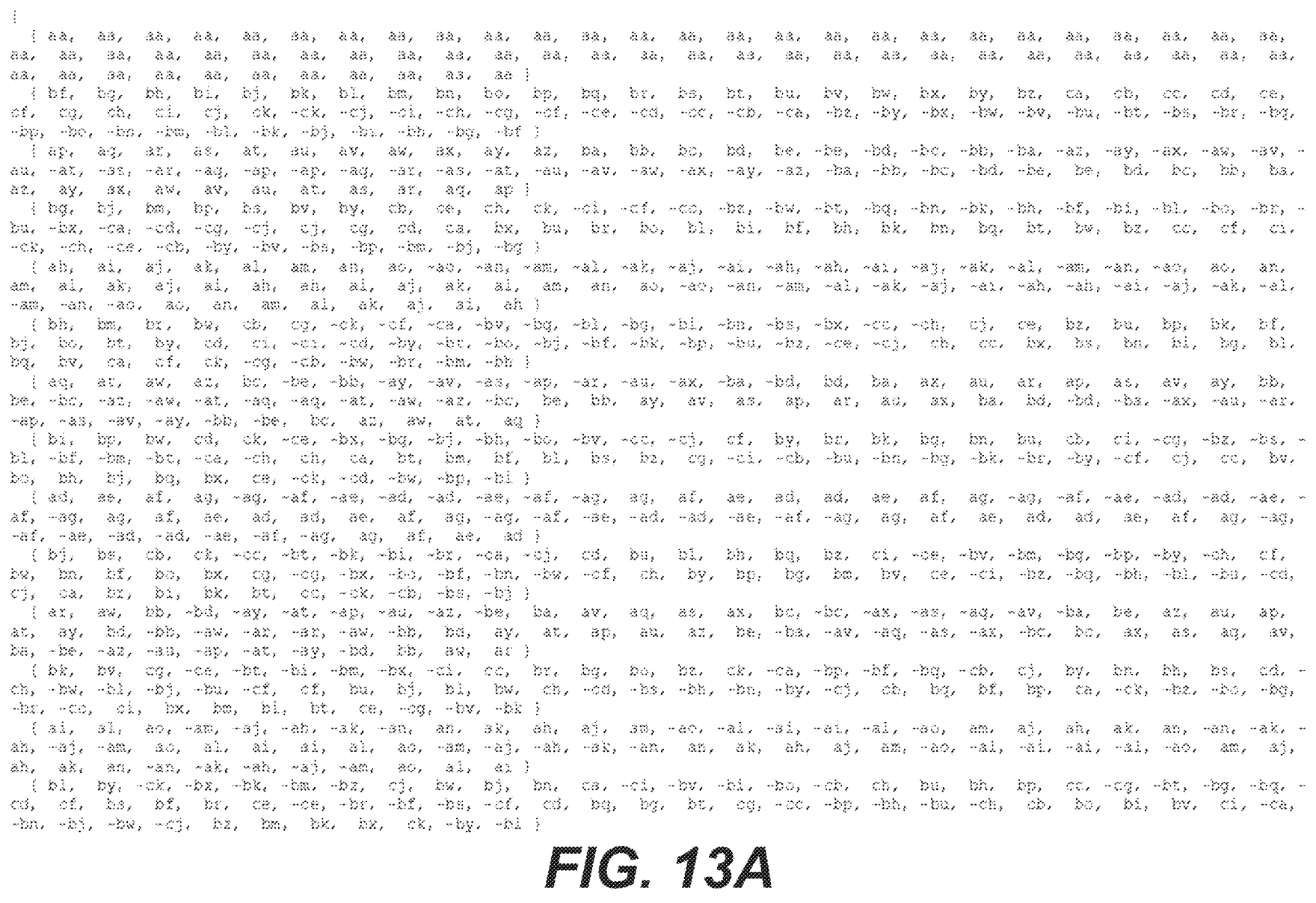
Figure 13B:
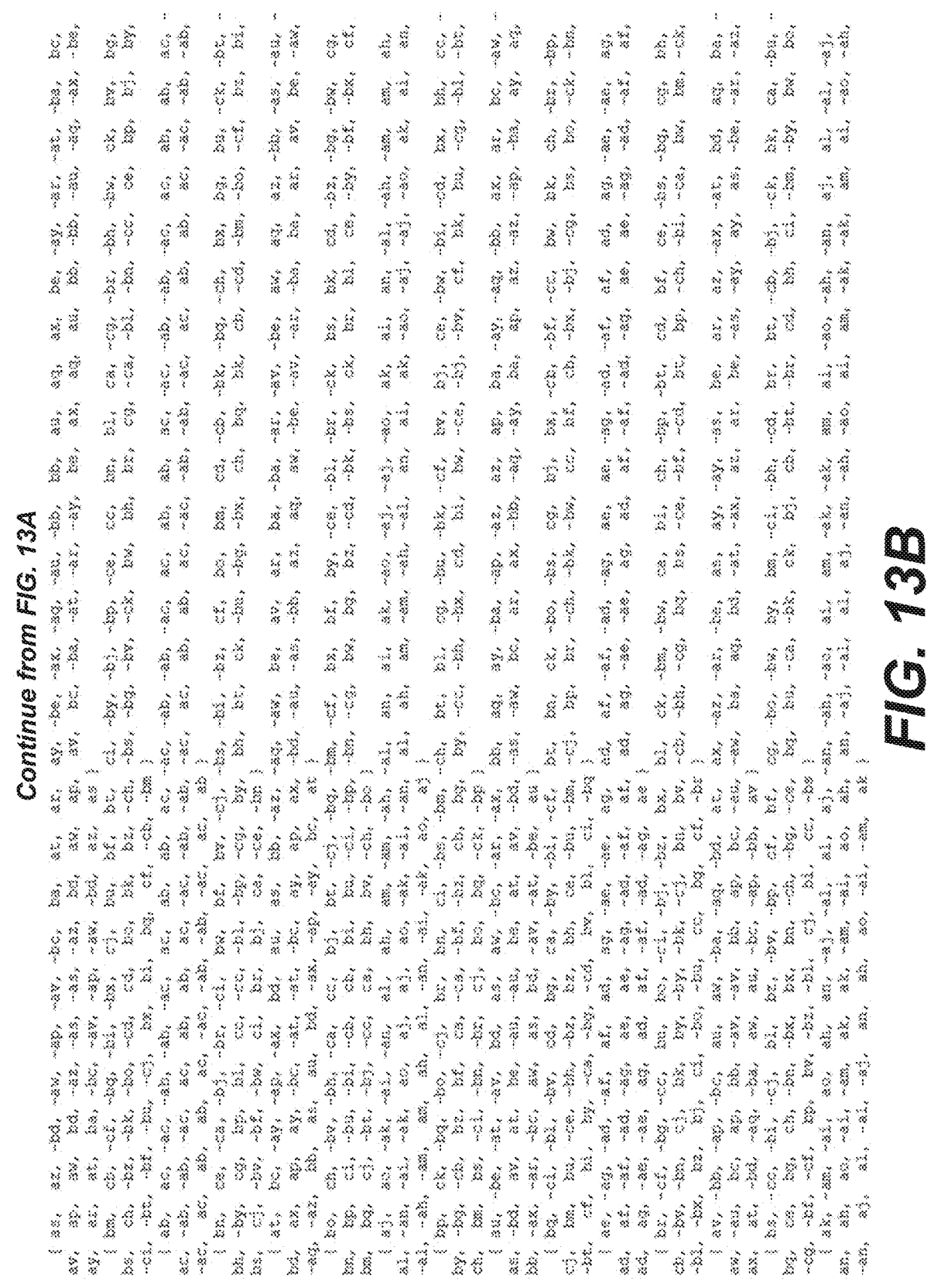
Figure 13C:
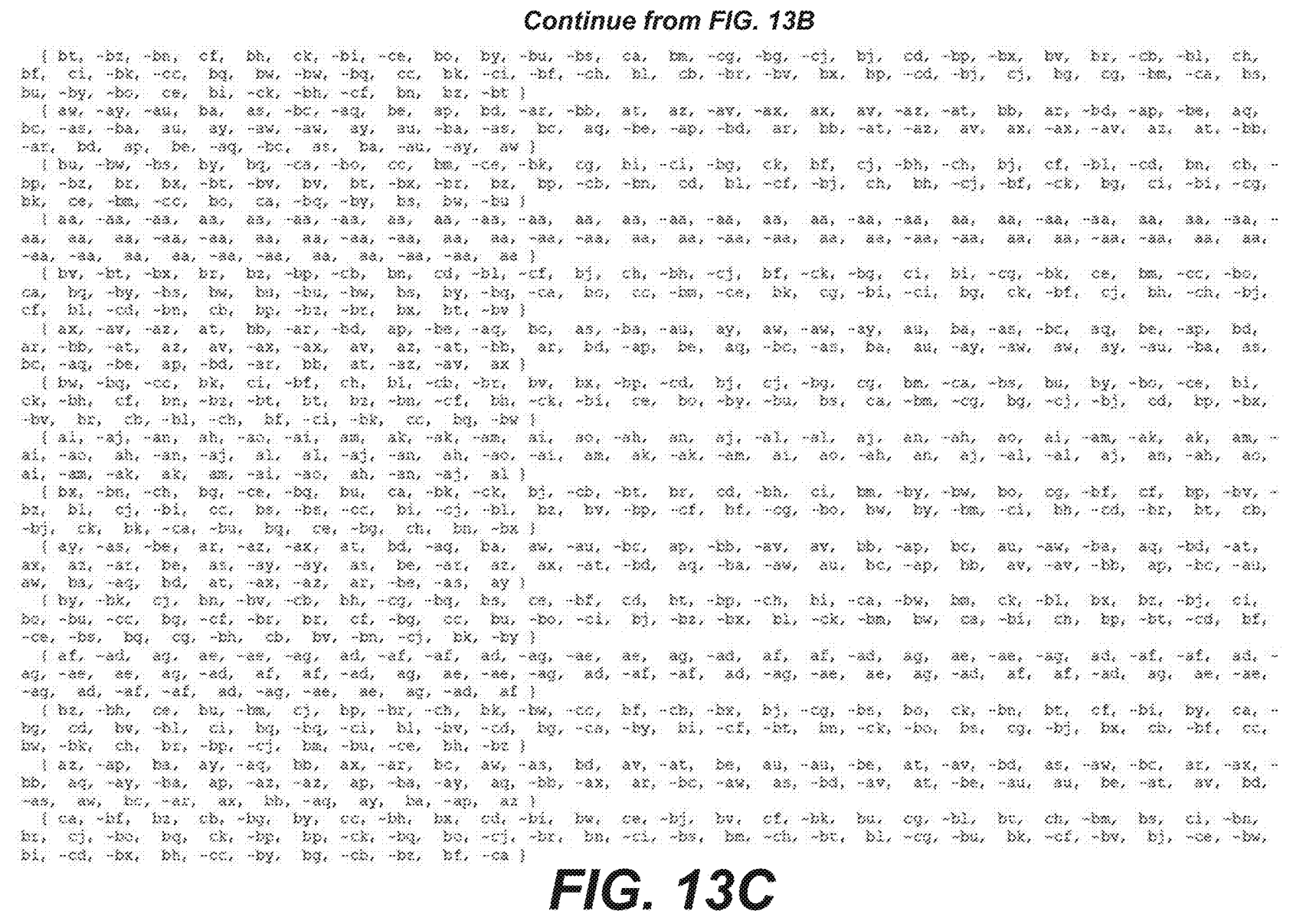
Figure 13D:
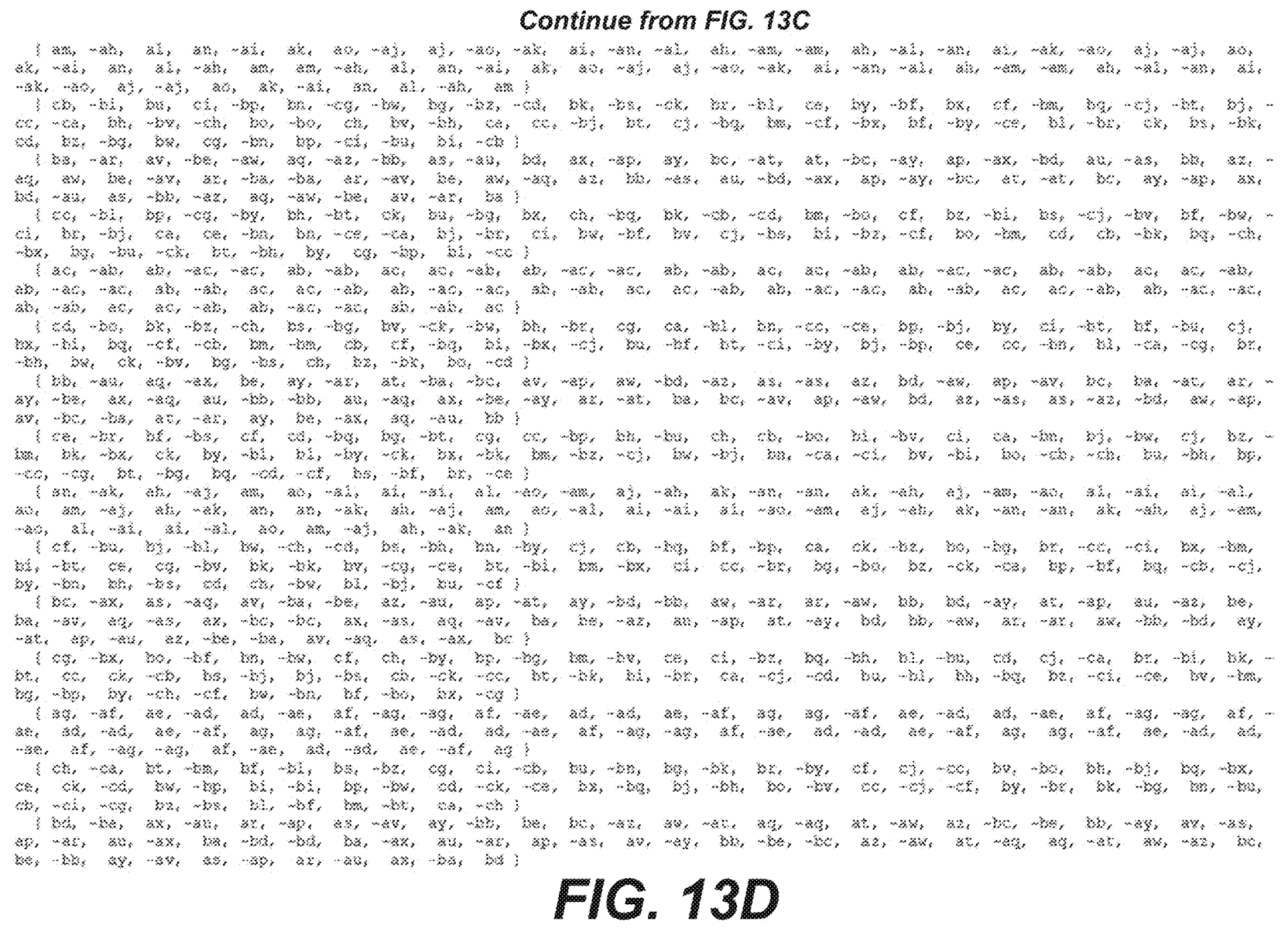
Figure 13E:
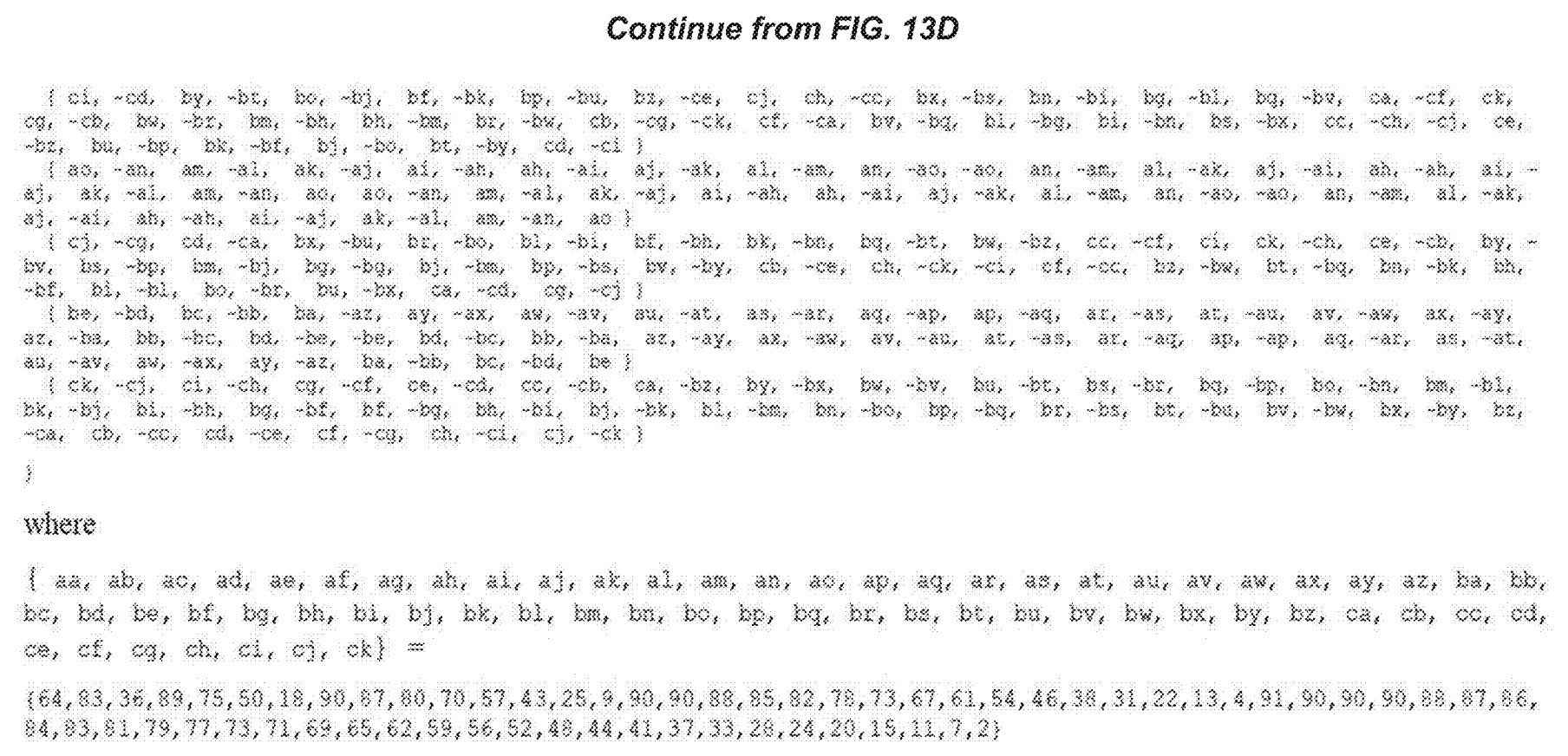

FIGS. 13A-13E show a 64×64 transform core matrix of a 64-point DCT-2 transform according to an embodiment.

FIG. 14 shows transform basis functions of DST/DCT transforms according to an embodiment.

FIG. 15 shows a table illustrating a mapping relationship between an mts_idx value and respective horizontal or vertical transforms according to an embodiment.

FIGS. 16A-16D show transform core matrices of a DST-7 transform type according to an embodiment.

Figure 17D:
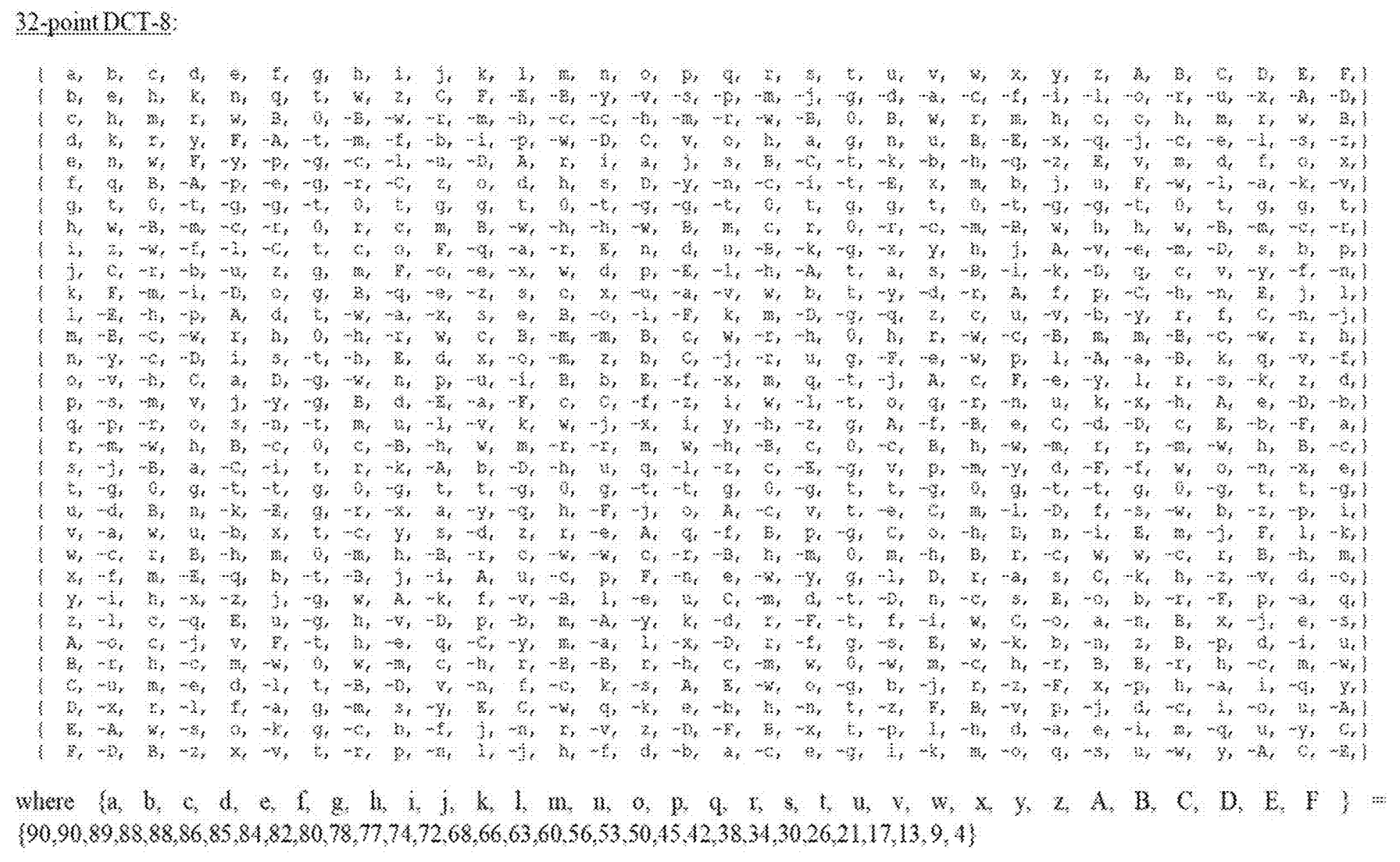

FIGS. 17A-17D show transform core matrices of a DCT-8 transform type according to an embodiment.

FIG. 18 shows an example of controlling usage of multiple transform selection (MTS) using sequence parameter set (SPS) syntax elements.

FIG. 19 shows a table of mapping between intra prediction modes and transform sets according to an embodiment.

FIG. 22 shows an example CU-level syntax table (2200) where a syntax element lfnst_idx indicating a selection of a low frequency non-separable secondary transform (LFNST) kernel is signaled at the end of CU-level syntax.

FIG. 23 shows a process (2301) of a reduced transform and a process (2302) of a reduced inverse transform according to an embodiment.

FIG. 24A shows the whole top-left 8×8 coefficients (shaded sub-blocks) of a residual block (2410) used as input for calculating a secondary transform in RST8×8.

FIG. 24B shows the top-left three 4×4 sub-block coefficients (shaded sub-blocks) of the residual block (2410) used as input for calculating a secondary transform in RST8×8.

FIG. 25 shows a table for transform set selection based on an intra prediction mode according to an embodiment.

FIG. 27 shows a CU-level syntax table where flags signaling matrix-based intra prediction (MIP) modes are shown in a frame (2701) according to an embodiment.

FIGS. 28A-28B in combination show a text (2800) specifying a transform coding process of performing explicit or implicit transform selection for a current block based on related syntax elements received from a bitstream.

FIG. 29 shows modifications (2900) to the text (2800) that correspond to an implicit transform enabling scheme where implicit transform for intra residual blocks and explicit transform for inter residual blocks can coexist.

FIG. 30 shows modifications (3000) to the text (2800) that correspond to a scenario where an implicit transform is enabled when a non-separable secondary transform (NSST) is disabled.

FIG. 31 shows modifications (3100) to the text (2800) that correspond to a scenario where an implicit transform is enabled when an MIP is disabled.

FIG. 32 shows modifications (3200) to the text (2800) that correspond to a scenario where both MTS and NSST are not applied to a current block.

FIG. 33 shows modifications (3300) to the text (2800) that correspond to a scenario where none of MTS, NSST, or MIP is applied to a current block.

FIGS. 34-36 show flow charts of transform coding processes (3400), (3500), and (3600) according to some embodiments of the disclosure.

DETAILED DESCRIPTION OF EMBODIMENTS

I. Video Coding Encoder and Decoder

Figure 1:
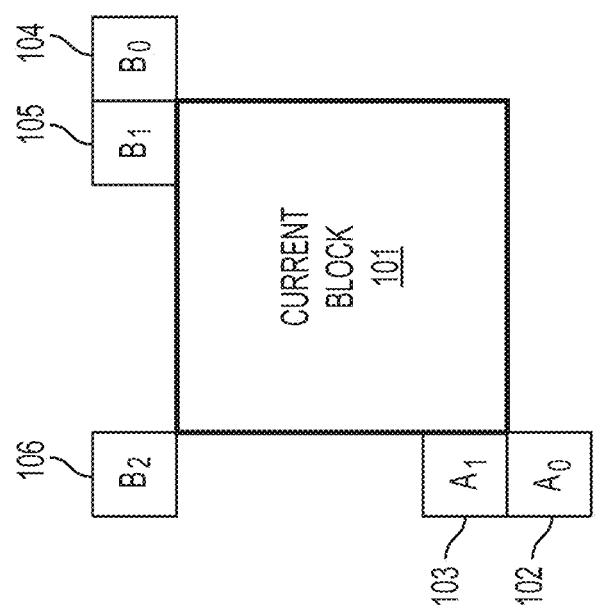
FIG. 1 is a schematic illustration of a current block and its surrounding spatial merge candidates in one example.
Figure 2:
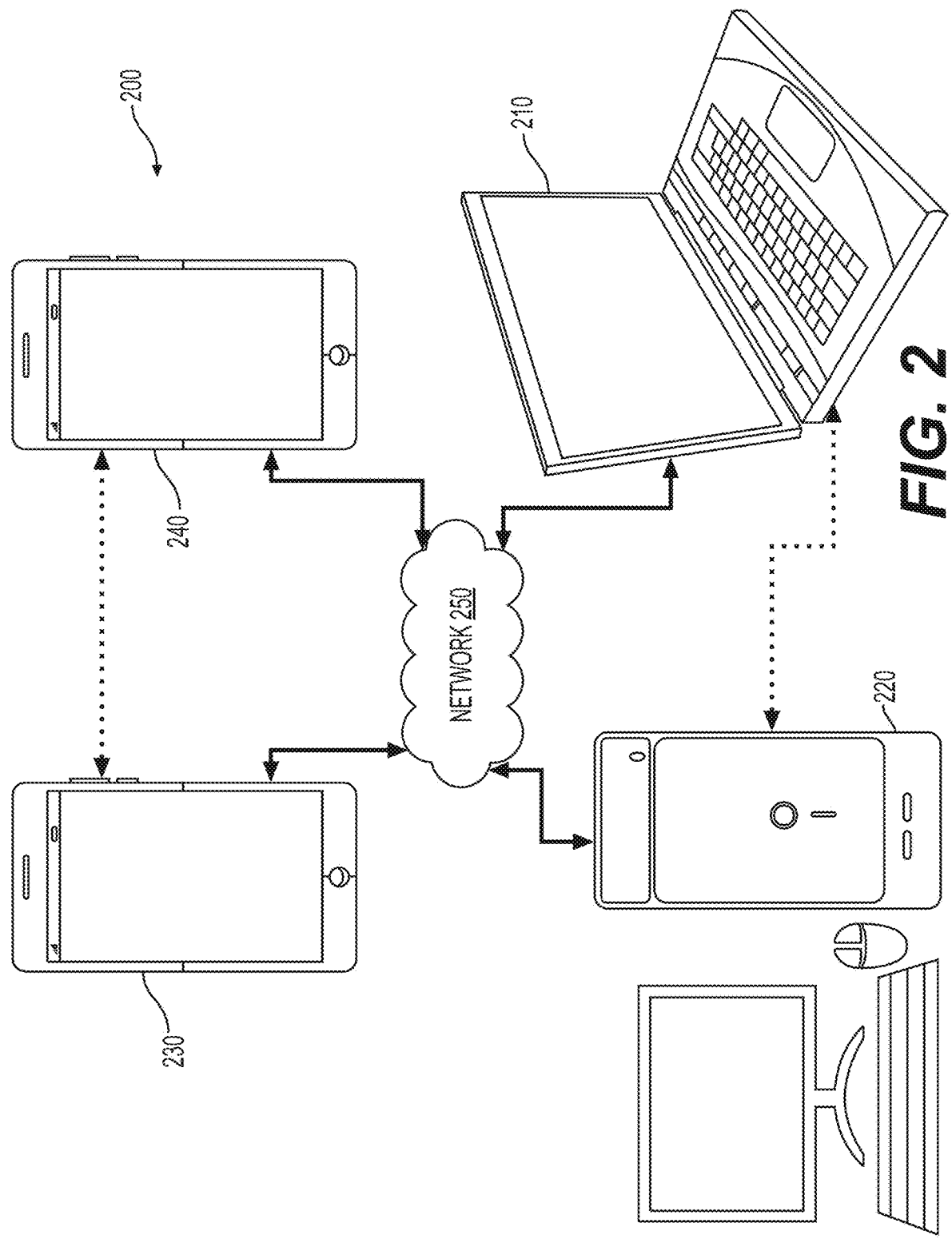
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
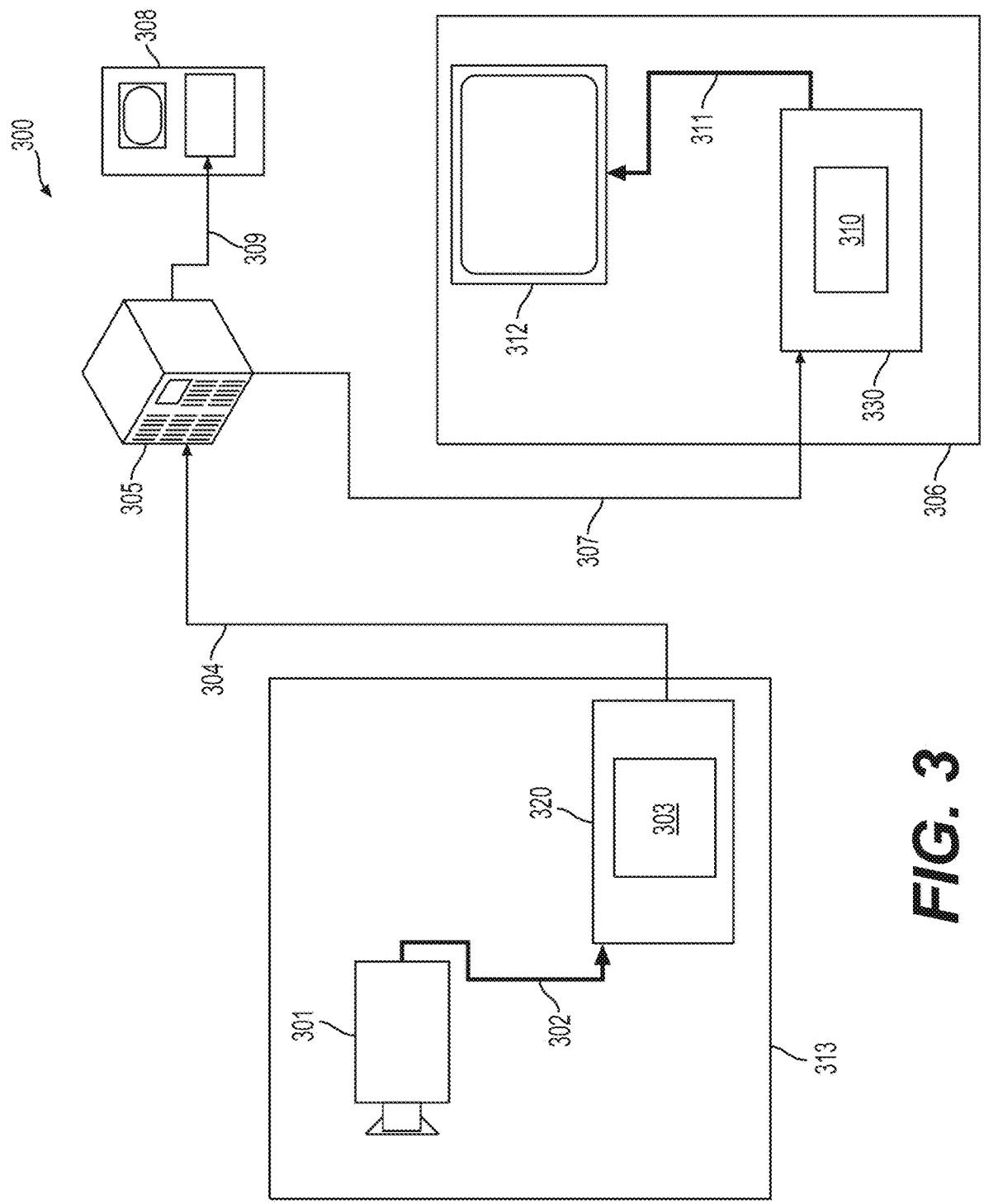
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
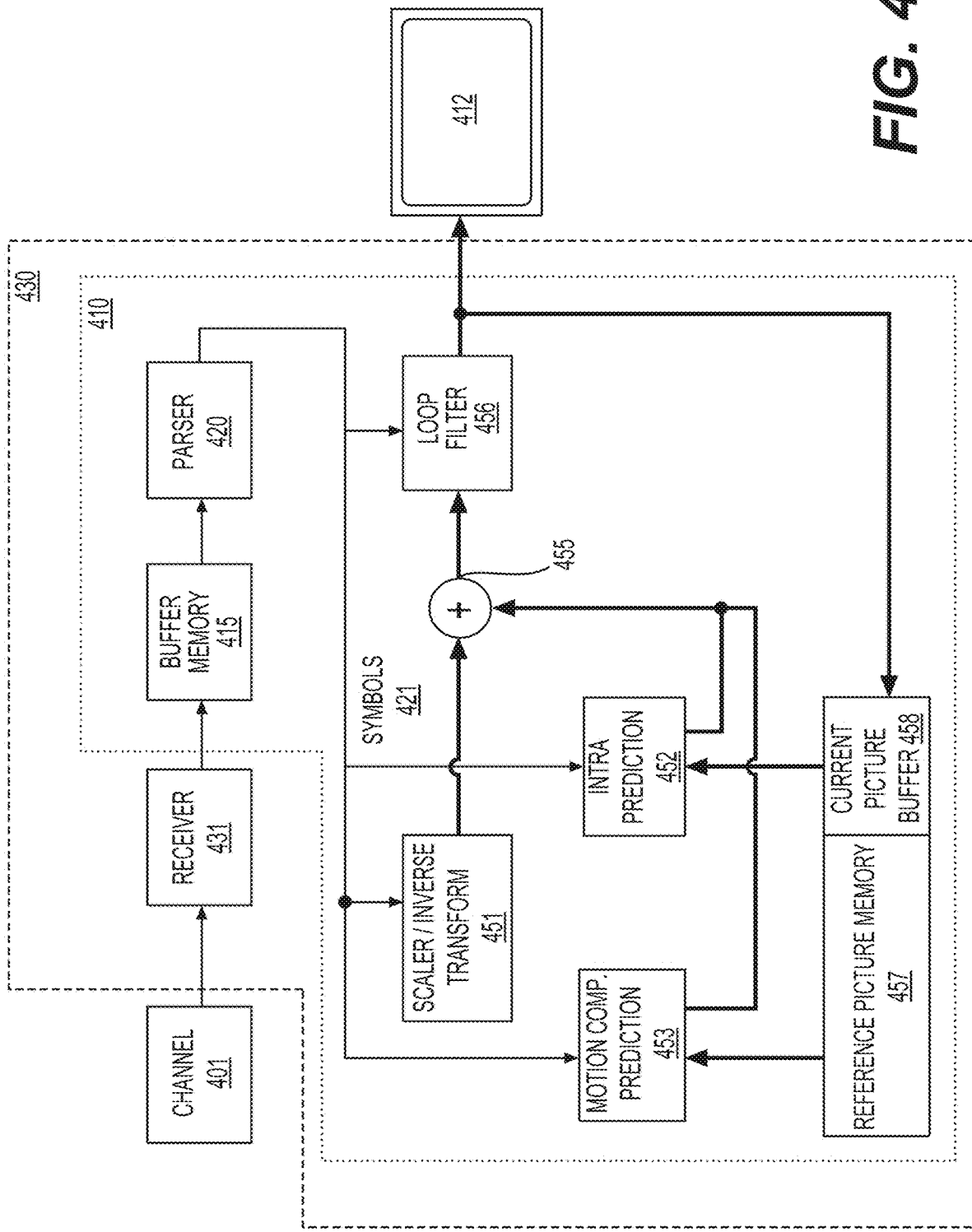
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
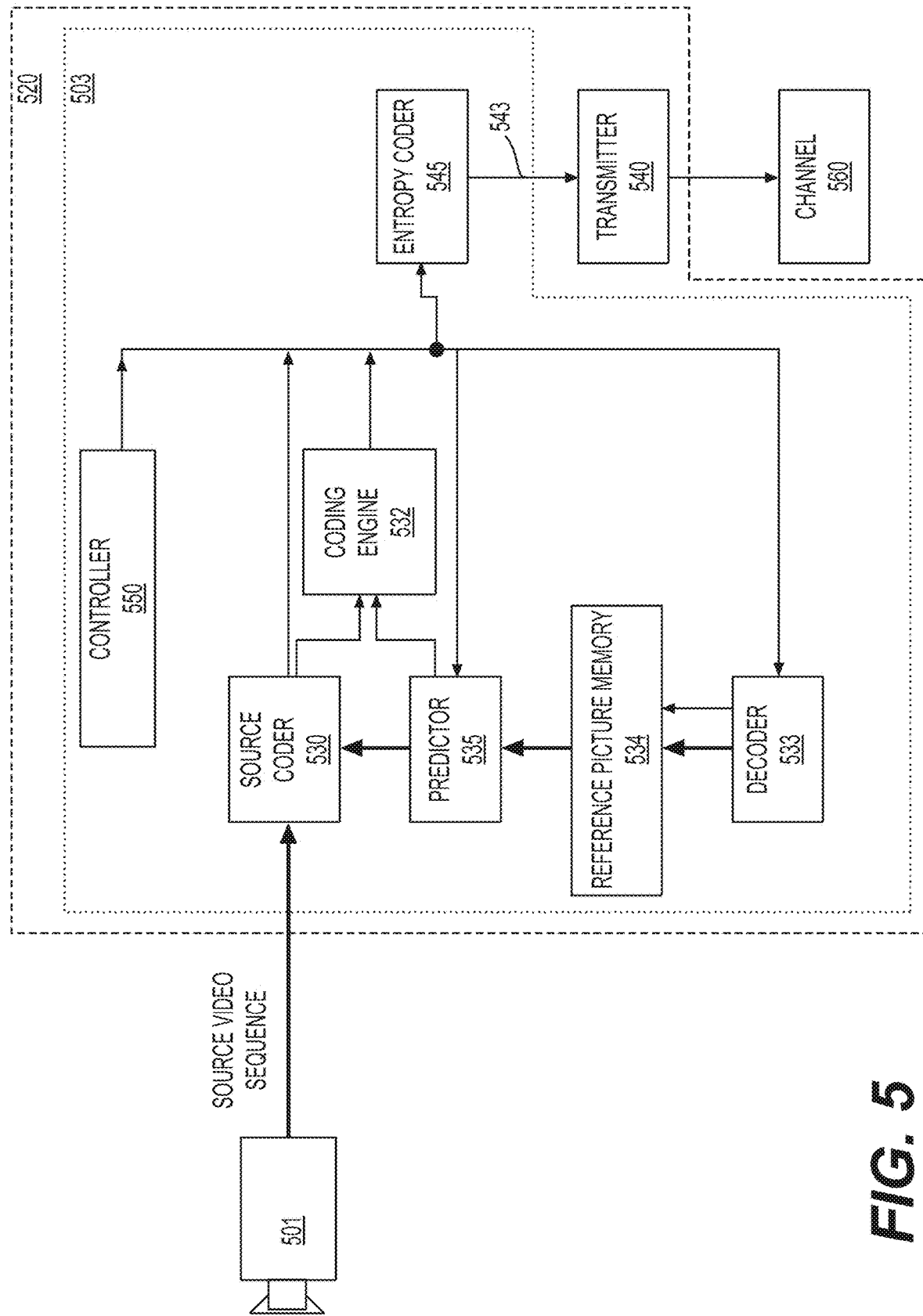
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
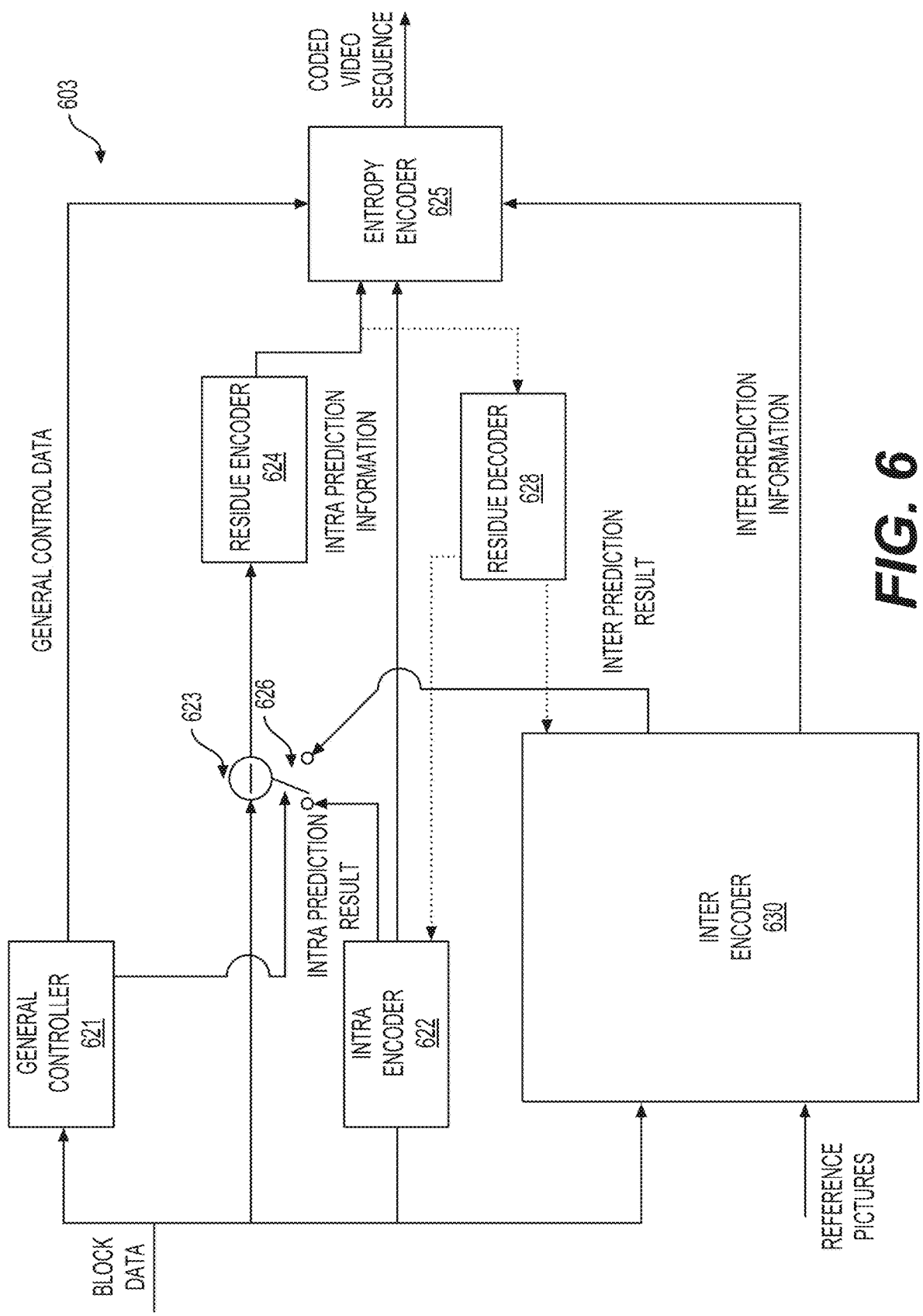
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
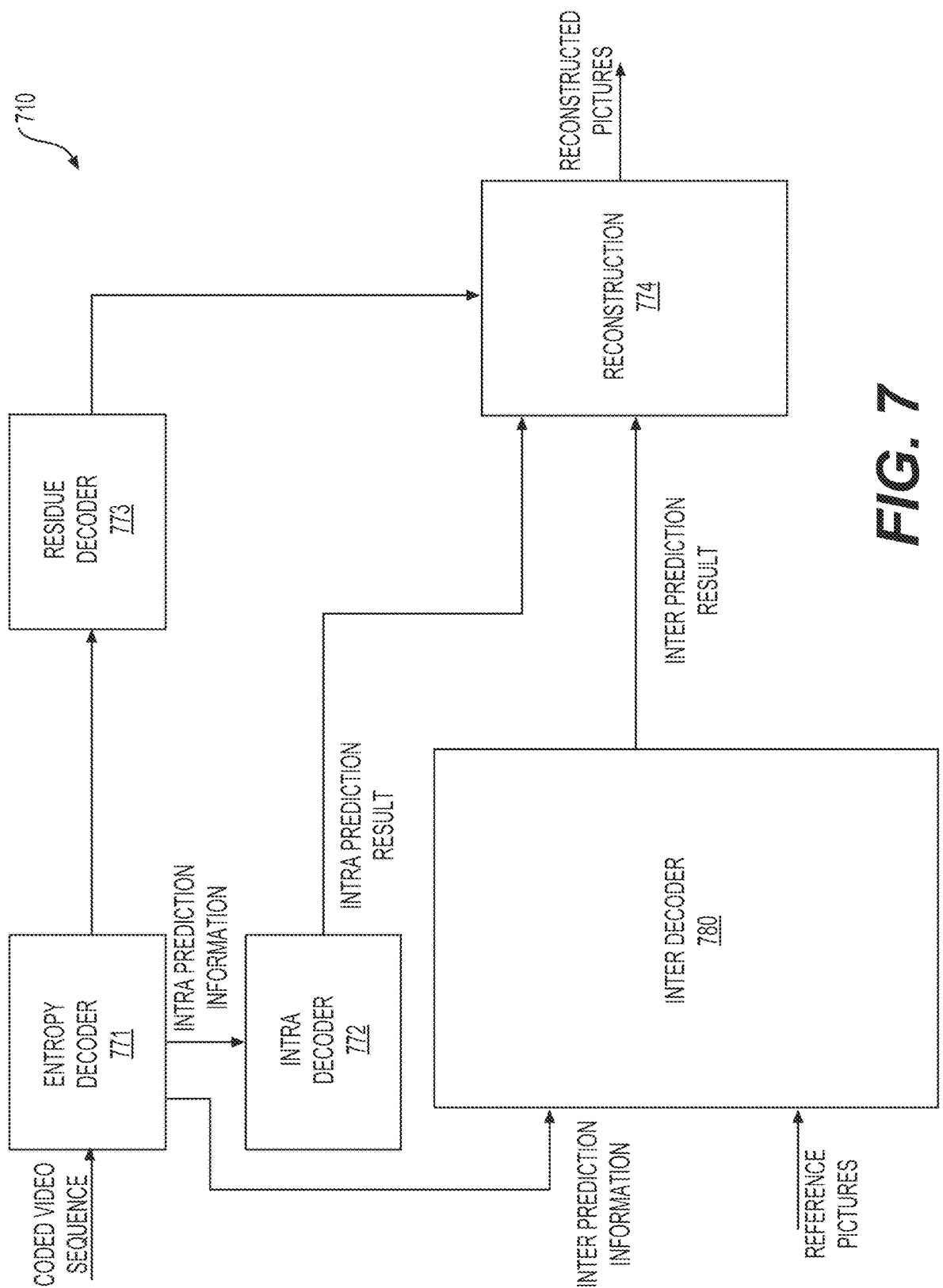
FIG. 7 shows a block diagram of a decoder in accordance with another embodiment.
Figure 9B:
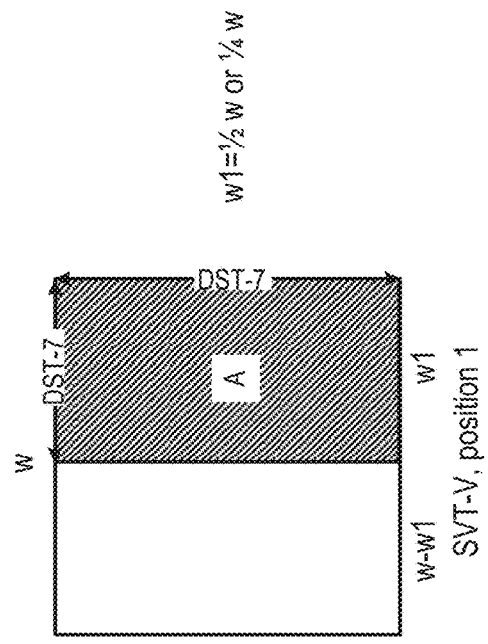
FIGS. 9A-9D show sub-block types, sizes, and positions supported in sub-block transform (SBT) according to an embodiment.
Figure 9A:
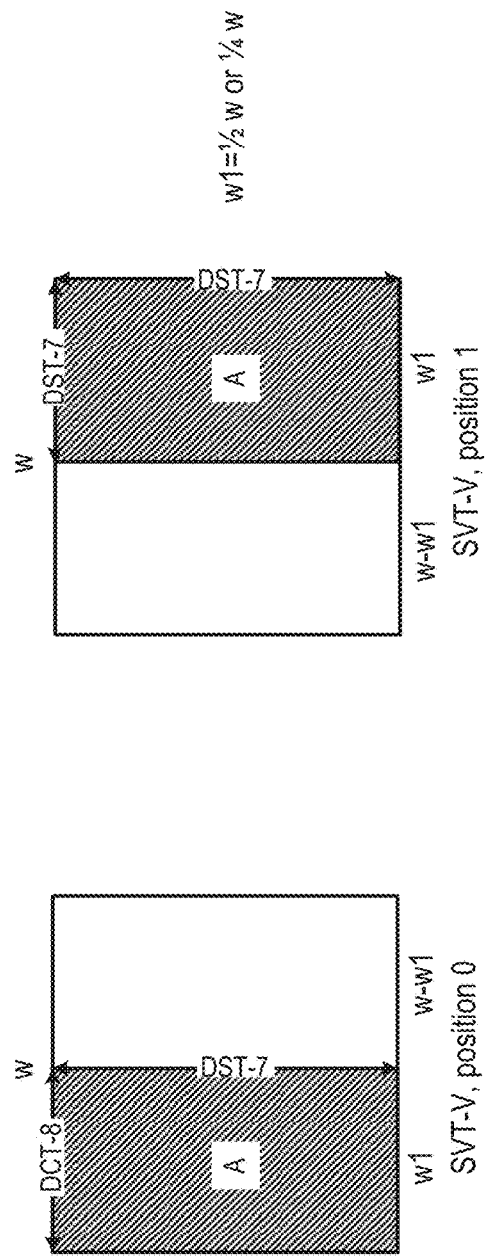
Figure 9D:
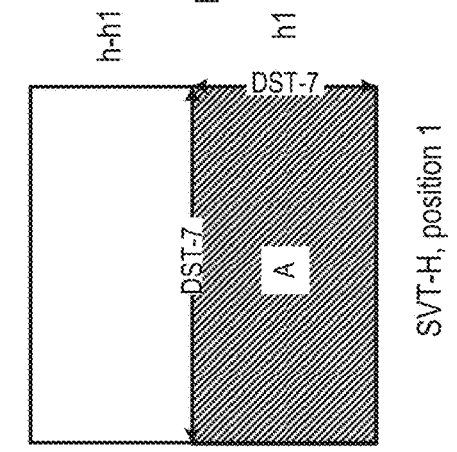
Figure 9C:
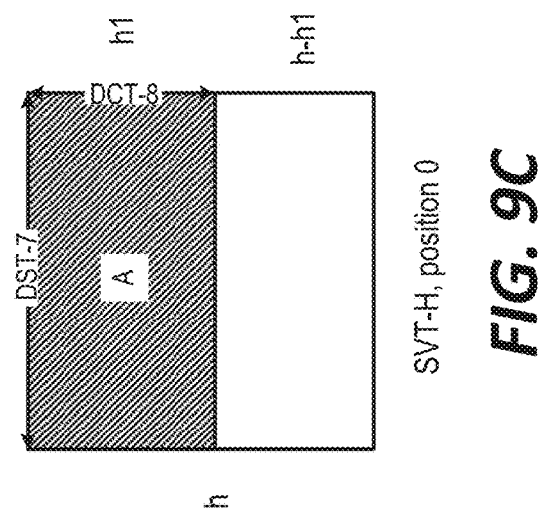

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780) and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771)(data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Transform Coding Techniques and Related Techniques

1. DCT-2 Primary Transform Examples

In some embodiments, 4-point, 8-point, 16-point and 32-point DCT-2 transforms are used as primary transforms. FIGS. 8A-8D show transform core matrices of 4-point, 8-point, 16-point, and 32-point DCT-2, respectively. Elements of those transform core matrices can be represented using 8-bit integers, and thus those transform core matrices are referred to as 8-bit transform cores. As shown, the transform core matrix of a smaller DCT-2 is a part of that of a larger DCT-2.

The DCT-2 core matrices show symmetry/anti-symmetry characteristics. Accordingly, a so-called "partial butterfly" implementation can be supported to reduce the number of operation counts (multiplications, adds/subs, shifts). Identical results of matrix multiplication can be obtained using the partial butterfly implementation compared with that the partial butterfly implementation is not used.

2. Sub-Block Transform Coding Examples

2.1 Sub-Block Transform (SBT)

In some embodiments, a sub-block transform (SBT), also referred to as spatially varying transform (SVT), is employed. The SBT is applied to inter prediction residuals in some embodiments. For example, a coding block can be partitioned into sub-blocks, only part of the sub-blocks is treated at a residual block. Zero residual is assumed for the remaining part of the sub-blocks. Therefore, the residual block is smaller than the coding block, and a transform size in SBT is smaller than the coding block size. For the region which is not covered by the residual block, no transform processing is performed.

FIGS. 9A-9D show sub-block types (SVT-H, SVT-V) (e.g., vertically or horizontally partitioned), sizes and positions (e.g., left half, left quarter, right half, right quarter, top half, top quarter, bottom half, bottom quarter) supported in SBT. The shaded regions labeled by letter "A" are residual blocks to be transform-coded, and the other regions are assumed to be zero residual without transform.

2.2. Intra Sub-Partition (ISP) Coding Mode

Figure 11:
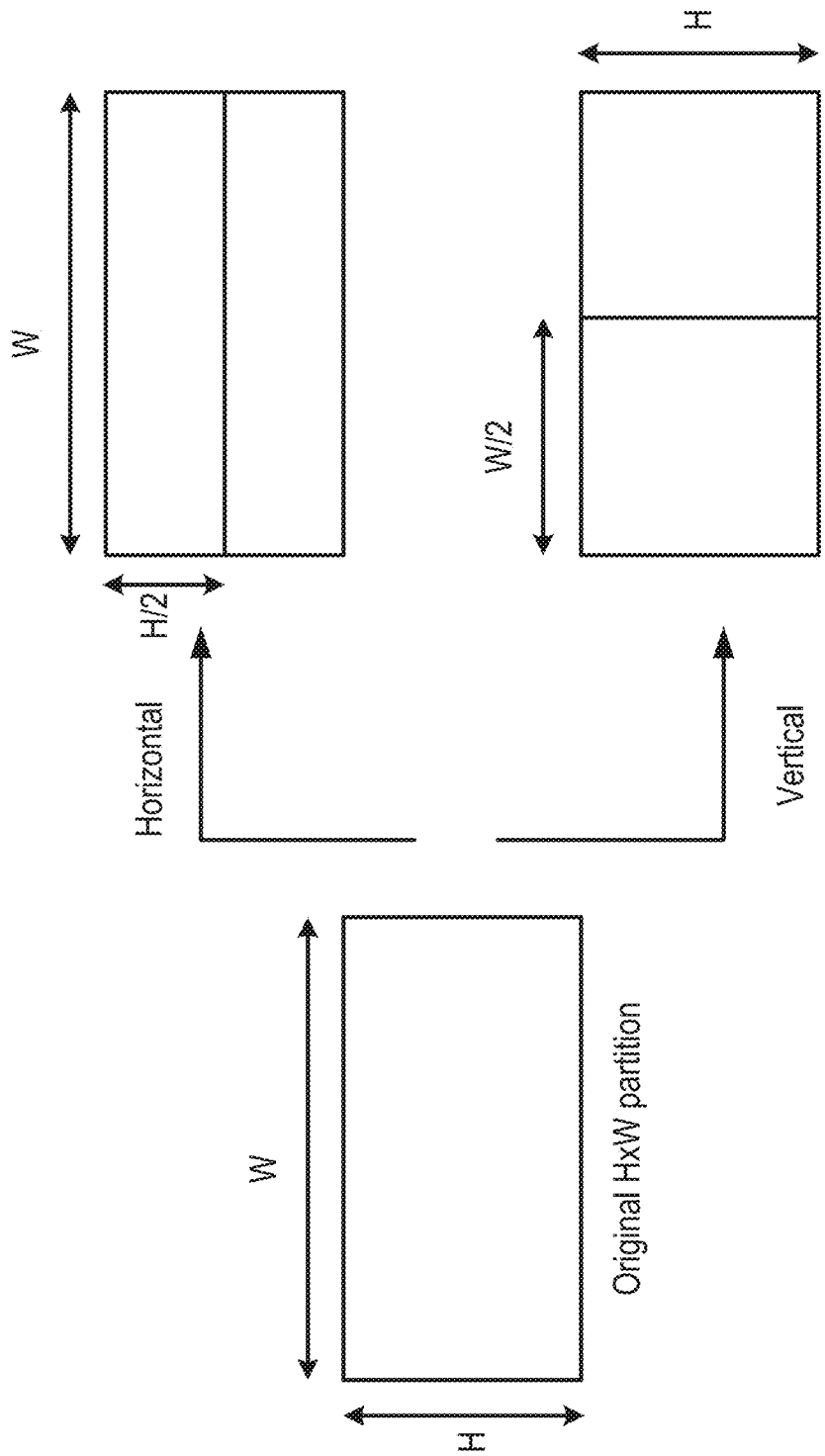
FIG. 11 shows an example where a block is partitioned into two sub-partitions in an ISP coding mode.
Figure 12:
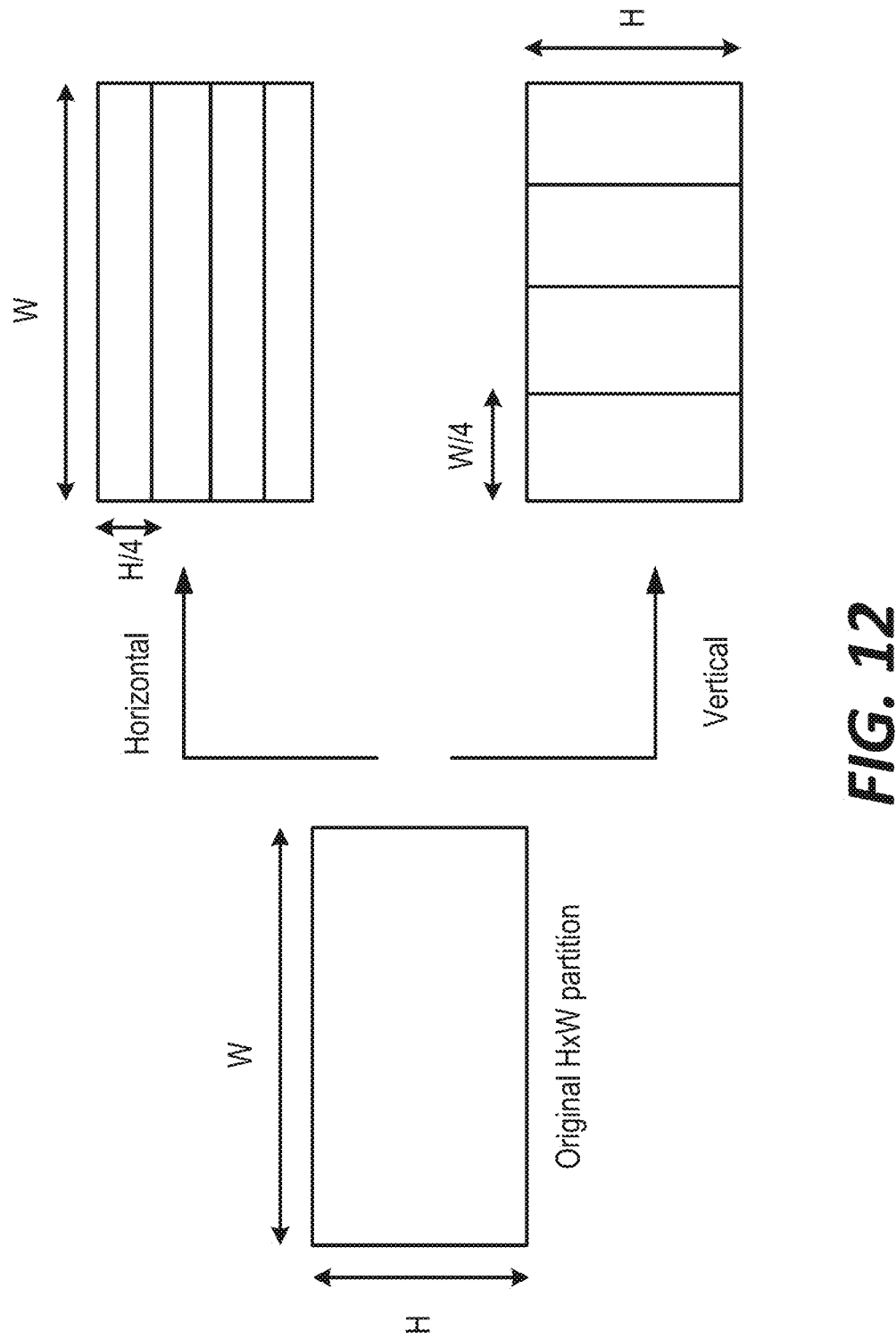
FIG. 12 shows an example where a block is partitioned into four sub-partitions in an ISP coding mode.
Figure 16D:
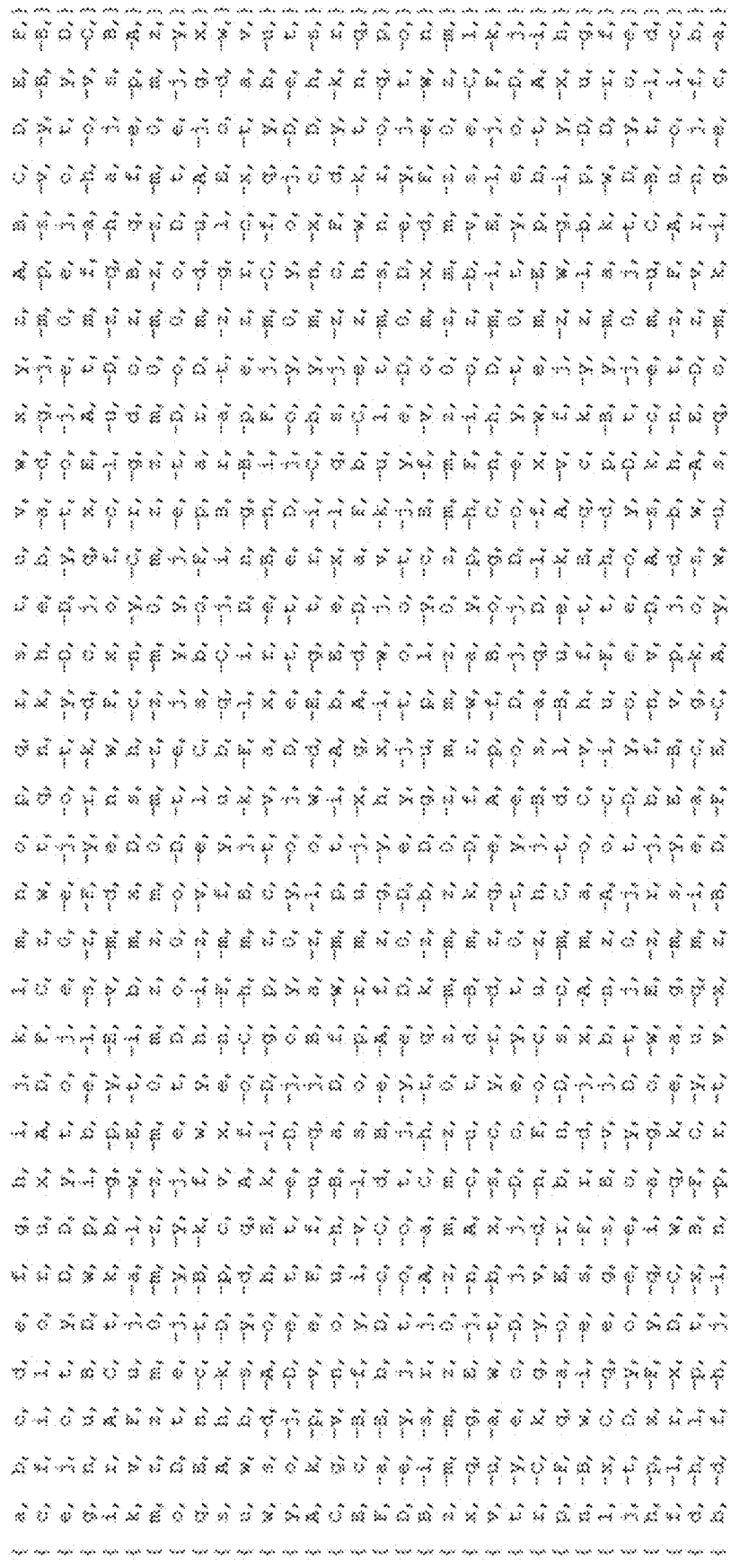

In some embodiments, an intra sub-partition (ISP) coding mode is employed. In ISP coding mode, a luma intra-predicted block can be partitioned vertically or horizontally into 2 or 4 sub-partitions. The number of sub-partitions can depend on a size of the block. FIG. 10 shows numbers of sub-partitions depending on the block size. FIG. 11 shows a scenario where a block is partitioned into two sub-partitions. FIG. 12 shows a scenario where a block is partitioned into four sub-partitions. In an example, all sub-partitions fulfill a condition of having at least 16 samples. In an example, ISP is not applied to chroma components.

In an example, for each of sub-partitions partitioned from a coding block, a residual signal is generated by entropy decoding respective coefficients sent from an encoder and then inverse quantizing and inverse transforming them. Then, a first one of the sub-partitions is intra predicted to generate a prediction signal. The prediction signal is added to the respective residual signal of the first sub-partition to obtain corresponding reconstructed samples. Thereafter, the reconstructed sample values of the first sub-partition can be available to generate a prediction of a second one of the sub-partitions. This process can be repeated sub-partition by sub-partition, until all sub-partitions from the coding block are reconstructed. In an example, all the sub-partitions share a same intra mode.

In an embodiment, the ISP coding mode is only tested with intra modes that are part of a most probable mode (MPM) list. Accordingly, if a block uses ISP, then a MPM flag can be inferred to be one. In addition, when ISP is used for a certain block, then a respective MPM list will be modified to exclude DC mode and to prioritize horizontal intra modes for the ISP horizontal split and vertical intra modes for the vertical one.

In ISP coding mode, each sub-partition can be regarded as a sub-TU, since the transform and reconstruction is performed individually for each sub-partition.

3. Transform Coding with Expanded DCT-2 Transforms and Multiple Transform Selection (MTS)

In some embodiments, when both the height and width of a coding block is smaller than or equal to 64 samples, a transform size is always the same as a coding block size. When either the height or width of ta coding block is larger than 64 samples, when performing transform or intra prediction, the coding block is further split into multiple sub-blocks, where the width and height of each sub-block is smaller than or equal to 64, and transform processing is performed on each sub-block.

3.1 Transform Coding with Expanded DCT-2 Transforms

In some embodiments, in addition to 4-point, 8-point, 16-point and 32-point DCT-2 transforms described above, 2-point and 64-point DCT-2 transform can be used. FIGS. 13A-13E show a 64×64 transform core matrix of the 64-point DCT-2 transform.

3.2 Explicitly Signaled Transform

In some embodiments, in addition to DCT-2 and 4×4 DST-7 transform coding, a multiple transform selection (MTS) (also known as enhanced multiple transform (EMT), or adaptive multiple transform (AMT)) can be used for residual coding of both inter and intra coded blocks. The MTS uses multiple selected transforms from discrete cosine transform (DCT)/discrete sine transform (DST) families other than the DCT-2 and 4×4 DST-7 transforms. The selection can be performed at an encoder and explicitly signaled from the encoder to a decoder. For example, the selected transforms can include DST-7, or DCT-8 transforms. FIG. 14 shows transform basis functions of DST/DCT transforms. In some embodiments, the DST/DCT transform core matrices used in MTS are represented with 8-bit representation.

In some embodiments, MTS can be applied to CUs with both a width and height smaller than or equal to 32 samples. Whether to apply MTS or not can be controlled by a flag denoted by mts_flag. For example, when the mts_flag is equal to 0, only DCT-2 is applied to coding a residue block. When the mts_flag is equal to 1, which indicates MTS is applied, selected transforms can be used. For example, an index, denoted by mts_idx, can further be signaled using 2 bins to specify a horizontal and vertical transforms to be used.

FIG. 15 shows a table (1500) illustrating a mapping relationship between an mts_idx value and respective horizontal or vertical transforms. The row (1301) with the mts_idx having a value of −1 corresponds to a scenario where the mts_flag is equal to 0 (which indicates MTS is not applied), and DCT-2 transform is used. The rows (1302)-(1305) with the mts_idx having a value of 0, 1, 2, or 3 corresponding to a scenario where the mts_flag is equal to 1 (which indicate MTS is applied). In the right two columns of the table (1500), 0 represents a transform type of DCT-2, 1 represents a transform type of DST-7, and 2 represents a transform type of DCT-8.

FIGS. 16A-16D show transform core matrices of a DST-7 transform type. FIGS. 17A-17D show transform core matrices of a DCT-8 transform type.

In some embodiments, MTS can be enabled or disabled using high level syntax (HLS) elements. Each of the HLS elements can be a video parameter set (VPS) syntax element, a sequence parameter set (SPS) syntax element, a picture parameter set (PPS) syntax element, a slice header syntax element, a tile header syntax element, or a tile group header syntax element, and the like. FIG. 18 shows an example of controlling usage of MTS using SPS syntax elements. As shown, an SPS syntax element, sps_mts_enabled_flag, can be signaled to indicate whether an MTS is enabled for a video sequence. When the MTS is enabled, two syntax elements, sps_explicit_mts_intra_enabled_flag and sps_explicit_mts_inter_enabled_flag, can be signaled to indicate whether the MTS is enabled for coding inter or intra predicted blocks, respectively.

In an embodiment, an implicit MTS is applied in case the above signaling based MTS (referred to as explicit MTS) is not used. With the implicit MTS, a transform selection can be made according to a block width and height instead of based on signaling. For example, with an implicit MTS, a DST-7 transform can be selected for a shorter side of a transform block and a DCT-2 transform can be selected for a longer side of the transform block.

3.3 Scenarios where Implicit Transform Selection is Applied

In various embodiments, for certain scenarios, DST-7 and/or DCT-8 can be used without being explicitly signaled. For example, DST-7 and/or DCT-8 can be used implicitly based on information that is available for both an encoder and a corresponding decoder. These scenarios include:

3.3.1 Intra Sub-Partitioning (ISP)

For a residual block coded with an ISP mode, a horizontal transform is selected as DST-7 as long as a block width of the residual block is greater than or equal to 4 and less than or equal to 16, and a vertical transform is selected as DST-7 as long as a block height of the residual block is greater than or equal to 4 and less than or equal to 16.

3.3.2 Sub-Block Transform (SBT)

For an SBT mode, for a sub-TU located at the left half (or quarter) or right half (or quarter) of a current CU, the horizontal transform can be DCT-8 or DST-7, respectively. Otherwise (a sub-TU has a same width with a current CU), DCT-2 can be used sued. For a sub-TU located at the top half (or quarter) or bottom half (or quarter) of a current CU, the vertical transform can be DCT-8 or DST-7, respectively. Otherwise (a sub-TU has a same height with a current CU), DCT-2 can be used.

3.3.3 MTS Disabled By HLS Elements

For example, when the sps_mts_enabled_flag is signaled as true, but both the sps_explicit_mts_intra_enabled_flag and sps_explicit_mts_inter_enabled_flag are signaled as false, for intra prediction residuals, a horizontal transform can be selected as DST-7 as long as a respective block width is greater than or equal to 4 and less than or equal to 16, and a vertical transform can be selected as DST-7 as long as a respective block height is greater than or equal to 4 and less than or equal to 16.

4. Non-Separable Secondary Transform (NSST)

4.1 Initial Design of NSST

In some embodiments, a mode-dependent non-separable secondary transform (NSST) can be applied between a forward core transform and quantization (at an encoder) and between a de-quantization and inverse core transform (at a corresponding decoder). To keep low complexity, an NSST can only be applied to low frequency coefficients after the primary transform in some embodiments. If both a width (W) and a height (H) of a transform coefficient block is larger than or equal to 8, then 8×8 non-separable secondary transform can be applied to a top-left 8×8 region of the transform coefficients block. Otherwise, if either W or H of a transform coefficient block is equal to 4, a 4×4 non-separable secondary transform can be applied and the 4×4 non-separable transform is performed on the top-left min(8, W)×min(8, H) region of the transform coefficient block. The above transform selection rule is applied for both luma and chroma components.

Matrix multiplication implementation of a non-separable transform is described as follows using a 4×4 input block as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Eq. 1)}$$

is represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T \quad \text{(Eq. 2)}$$

The non-separable transform is calculated as, $$\vec{F} = T \cdot \vec{X}, \quad \text{(Eq. 3)}$$

where $\vec{F}$ indicates the transform coefficient vector, and T is a 16×16 transform matrix. The 16×1 coefficient vector $\vec{F}$ is subsequently re-organized as a 4×4 block using a scanning order for that block (horizontal, vertical or diagonal). The coefficients with smaller index will be placed with the smaller scanning index in the 4×4 coefficient block. In an example, a hypercube-givens transform (HyGT) with butterfly implementation is used instead of matrix multiplication to reduce the complexity of non-separable transform.

In an example of NSST, there can be totally 35×3 non-separable secondary transforms for both 4×4 and 8×8 block size, where 35 is the number of transform sets each corresponding to an intra prediction mode, and 3 is the number of NSST candidates for each intra prediction mode. The mapping from an intra prediction mode to the transform set is defined in a table (1900) shown in FIG. 19. For example, a transform set applied to luma/chroma transform coefficients can be specified by the corresponding luma/chroma intra prediction modes according to the table (1900). For intra prediction modes larger than 34 (e.g., diagonal prediction direction), the transform coefficient block is transposed before/after the secondary transform at the encoder/decoder.

For each transform set, the selected non-separable secondary transform candidate is further specified by an explicitly signaled CU-level NSST index. The index is signaled in a bitstream once per intra CU after transform coefficients and truncated unary binarization is used. The truncated value is 2 in case of planar or DC mode, and 3 for angular intra prediction mode. This NSST index is signaled only when there is more than one non-zero coefficient in a CU. The default value is zero when it is not signaled. Zero value of this syntax element indicates secondary transform is not applied to the current CU, values 1-3 indicates which secondary transform from the set should be applied.

NSST may be not applied for a block coded with a transform skip mode. When an NSST index is signaled for a CU and not equal to zero, NSST is not used for a block of a component that is coded with transform skip mode in the CU. When a CU with blocks of all components are coded in transform skip mode or the number of non-zero coefficients of non-transform-skip mode CBs is less than 2, the NSST index is not signaled for the CU.

4.2 Reduced Size Transform (RST)

In some embodiments, a variant of NSST, referred to as reduced size transform (RST), or low-frequency non-separable secondary transform (LFNST), is employed. The RST uses a transform zero-out scheme. Whether the intra prediction mode is Planar or DC is checked for entropy coding the transform index of NSST.

In an example, 4 transform sets are applied, and each transform set includes three RST transform cores. The RST transform cores can have a size of 16×48 (or 16×64) (applied for transform coefficient block with a height and width both being greater than or equal to 8) or 16×16 (applied for transform coefficient block with either height or width being equal to 4). For notational convenience, the 16×48 (or 16×64) transform is denoted as RST8×8 and the 16×16 one as RST4×4.

Figure 20:
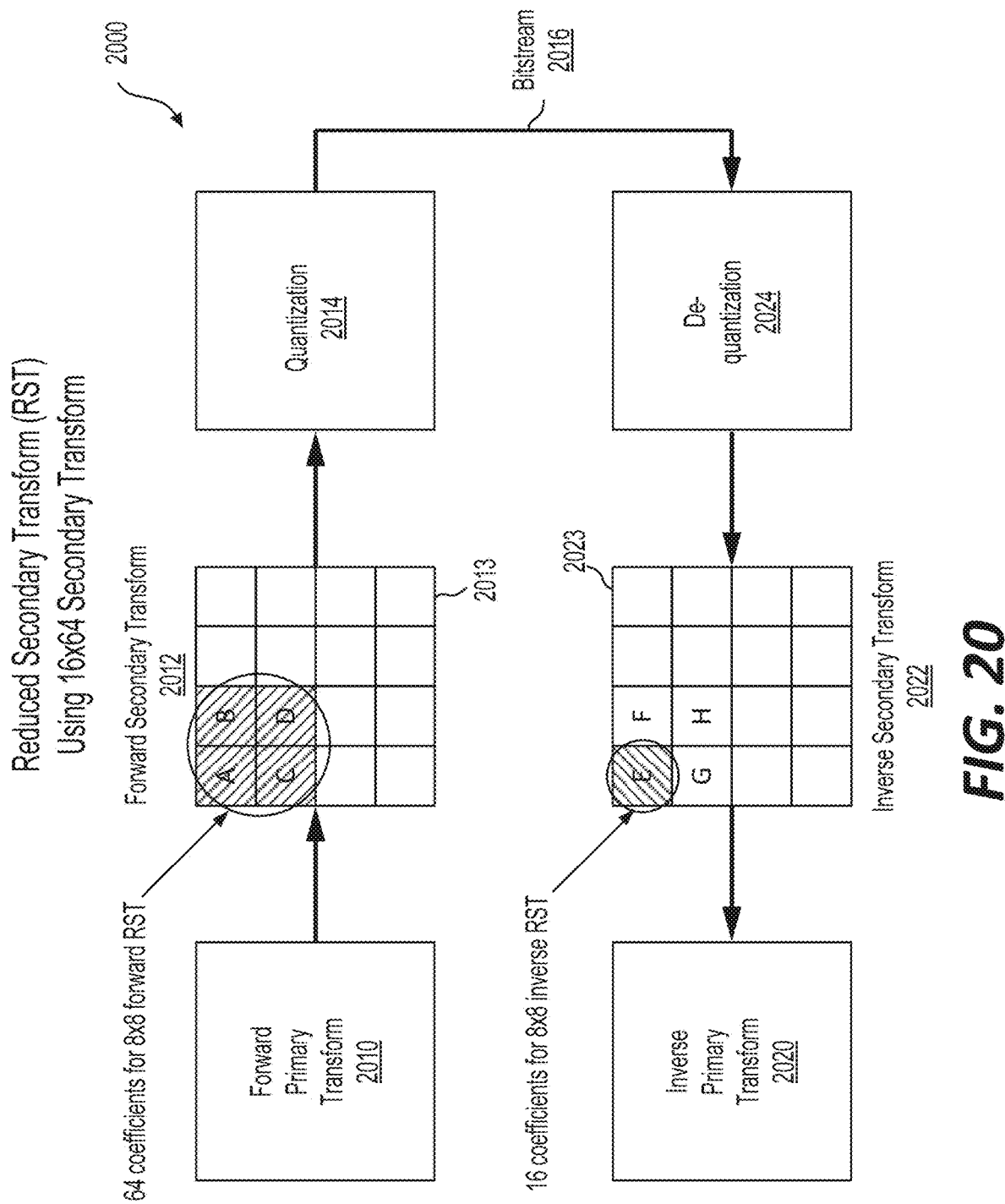
FIGS. 20-21 show two alternative transform coding processes (2000) and (2100) for RST8×8 using 16×64 transform cores and 16×48 transform cores, respectively, according to an embodiment.
Figure 21:
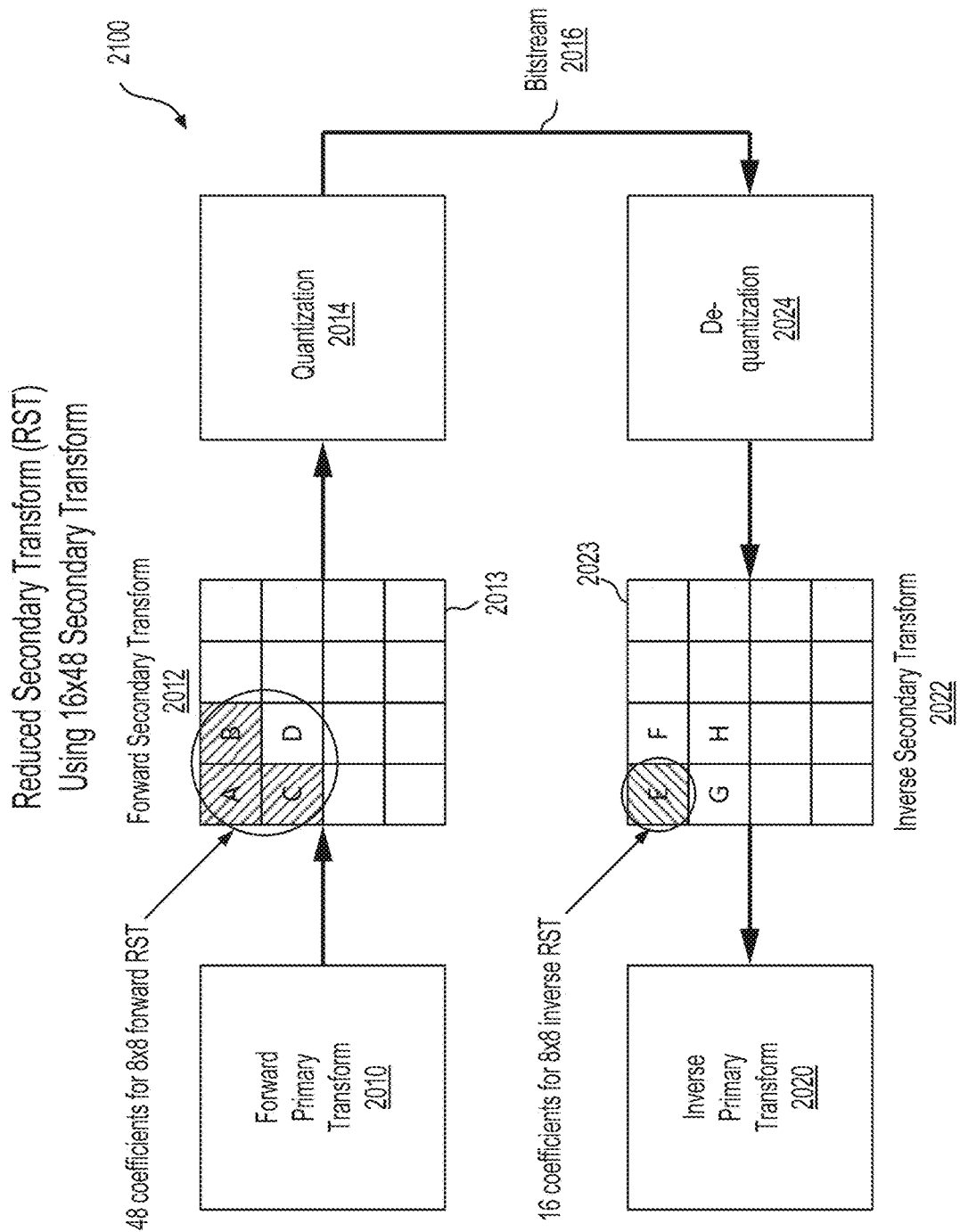

For RST8×8, two alternative transform coding processes (2000) and (2100) using 16×64 transform cores and 16×48 transform cores are shown in FIG. 20 and FIG. 21, respectively. The one using 16×48 transform cores are adopted in VVC Draft 5.

In the process (2000) of the FIG. 20 example, at an encoder side, a forward primary transform (2010) can first be performed over a residual block followed by a forward secondary transform (2012) over coefficients generated from the forward primary transform (2010). In the forward secondary transform (2012), the 64 coefficients of the 4×4 sub-blocks A/B/C/D at the top-left corner of the coefficient block (2013) is represented into a 64-length vector, and multiplied with a transform matrix of a size of 16×64 according to the equation (Eq. 3), resulting in a 16-length vector. The elements in the 16-length vector is filled back into the top-left 4×4 sub-block A of the coefficient block (2013). The coefficients in the sub-blocks B/C/D can take values of zero. The resulting coefficients after the forward secondary transform 2012 are then quantized at the step of (2014), and entropy-coded to generate coded bits in a bitstream (2016).

The coded bits can be received at a decoder side, and entropy-decoded followed by a de-quantization (2024) to generate a coefficient block (2023). An inverse secondary transform (2022) can be performed over the 16 coefficients at the top-left 4×4 sub-block E to obtain 64 coefficients that are filled back to the 4×4 sub-blocks E/F/G/H. Thereafter, the coefficients in the block (2023) after the inverse secondary transform (2022) can be processed with an inverse primary transform (2020) to obtain a recovered residual block.

The process (2100) of the FIG. 21 example is similar to the process (2000) except that fewer (48) coefficients are processed during the forward secondary transform (2012). Specifically, the 48 coefficients in the sub-blocks A/B/C are processed with a smaller transform matrix of a size of 16×48. Usage of the smaller transform matrix can reduce a memory size for storing the transform matrix, and respective computation complexity.

FIG. 22 shows an example CU-level syntax table (2200) where a syntax element lfnst_idx indicating a selection of a LFNST kernel is signaled at the end of CU-level syntax.

4.3 Examples of RST Computation

The main idea of a Reduced Transform (RT) is to map an N dimensional vector to an R dimensional vector in a different space, where R/N (R<N) is the reduction factor.

The RST matrix is an R×N matrix as follows:

$$T_{RxN} = \begin{bmatrix} t_{11} & t_{12} & t_{13} & \ldots & t_{1N} \\ t_{21} & t_{22} & t_{23} & & t_{2N} \\ \vdots & & & \ddots & \vdots \\ t_{R1} & t_{R2} & t_{R3} & \ldots & t_{RN} \end{bmatrix} \quad (Eq. 4)$$

where the R rows of the transform are R bases of the N dimensional space. The inverse transform matrix for RT is the transpose of its forward transform.

FIG. 23 shows a process (2301) of a reduced transform and a process (2302) of a reduced inverse transform. T represents an RST transform matrix having a dimension of R×N, and $T^T$ represents a transpose matrix of T having a dimension of N×R.

In RST8×8, a reduction factor of 4 (¼ size) is realized. For example, instead of 64×64, which is a conventional 8×8 non-separable transform matrix size, a 16×64 direct matrix is used. The 64×16 inverse RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication can be applied.

In addition, for RST8×8, to further reduce the transform matrix size, instead of the using the whole top-left 8×8 coefficients (shaded sub-blocks in FIG. 24A) of a residual block (2410) as input for calculating a secondary transform, the top-left three 4×4 sub-block coefficients (shaded sub-blocks in FIG. 24B) of the residual block (2410) are used as the input for calculating the secondary transform.

In an example, an inverse RST is conditionally applied when the following two conditions are satisfied: (i) a respective block size is greater than or equal to the given threshold (W>=4 && H>=4), and (ii) a transform skip mode flag is equal to zero. For example, if both width (W) and height (H) of a transform coefficient block is greater than 4, then the RST8×8 is applied to the top-left 8.8 region of the transform coefficient block. Otherwise, the RST4×4 is applied on the top-left min(8, W)×min(8, H) region of the transform coefficient block.

In an example, when an RST index is equal to 0, RST is not applied. Otherwise, RST is applied, and a kernel is chosen with the RST index. In an example, RST is applied for intra CU in both intra and inter slices, and for both luma and chroma. If a dual tree is enabled, RST indices for luma and chroma are signaled separately. For inter slice (the dual tree is disabled), a single RST index is signaled and used for both luma and chroma. When an ISP mode is selected, RST is disabled, and RST index is not signaled.

4.4 an Example of Selection of RST Transform Matrices

In an example, an RST matrix can be selected from four transform sets, each of which consists of two transforms. Which transform set is applied can be determined based on an applied intra prediction mode as follows. When one of three cross component linear model (CCLM) modes is indicated, transform set 0 can be selected. Otherwise, the transform set selection can be performed according to a table (2500) shown in FIG. 25. The index to access the table (2500), denoted by IntraPredMode, can be in a range of [−14, 83], which is a transformed mode index used for a wide angle intra prediction for example.

5. Matrix-Based Intra Prediction (MIP) Mode

Figure 26:
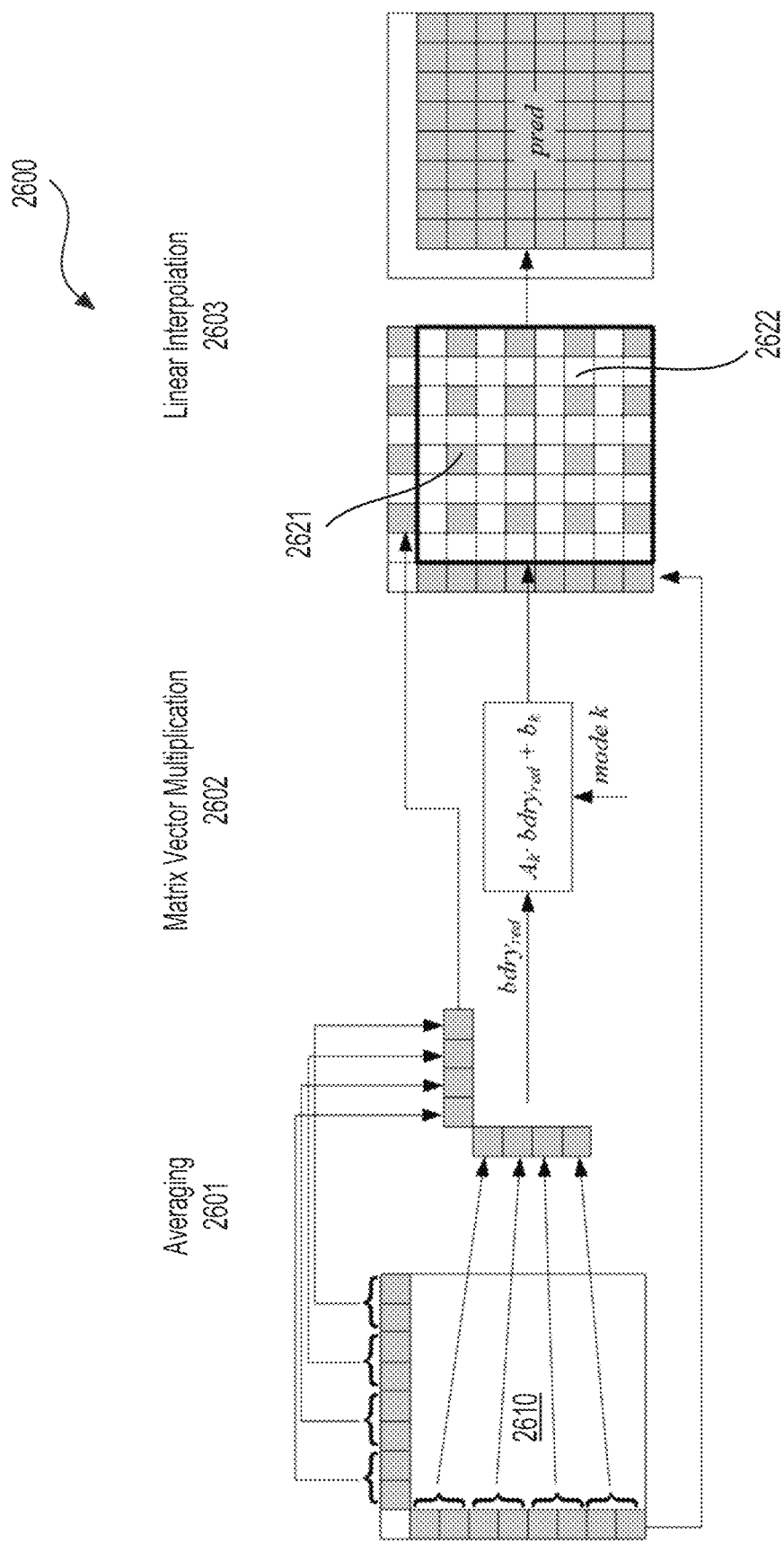
FIG. 26 shows an example process (2600) of a matrix-based intra prediction (MIP) mode.

In some embodiments, a matrix-based intra prediction (MIP) mode is employed. FIG. 26 shows an example process (2600) of the MIP mode. For predicting the samples of a rectangular block (2610) of width W and height H, an MIP takes one line of H reconstructed neighboring boundary samples at the left of the block (2610) and one line of W reconstructed neighboring boundary samples above the block (2610) as input. If the reconstructed samples are unavailable, the reconstructed samples can be generated in a similar way as in a conventional intra prediction.

Generation of prediction signals can be based on the following three steps from (2601) to (2603). At the step (2601), out of the boundary samples, four samples in the case of W=H=4 and eight samples in all other cases are extracted by averaging.

At the step (2602), a matrix vector multiplication $A_k \cdot \text{bdry}_{red}$, followed by addition of an offset $b_k$, is carried out with the averaged samples $\text{bdry}_{red}$ as an input. The result is a reduced prediction signal on a subsampled set of samples (2621) in the original block. The matrix $A_k$ and the offset $b_k$ can be selected based on an MIP mode index k.

At the step (2603), the prediction signal at the remaining positions (2622) is generated from the prediction signal on the subsampled set (2621) by a linear interpolation which is a single step linear interpolation in each direction.

The matrices $A_k$ and offset vectors $b_k$ needed to generate the prediction signal can be taken from three sets $S_0, S_1, S_2$ of matrices. The set $S_0$ consists of 18 matrices $A_0^i$, $i \in \{0, \ldots, 17\}$ each of which has 16 rows and 4 columns and 18 offset vectors $b_0^i$, $i \in \{0, \ldots, 17\}$ each of size 16. Matrices and offset vectors of that set are used for blocks of size 4×4. The set $S_1$ consists of 10 matrices $A_1^i$, $i \in \{0, \ldots, 9\}$, each of which has 16 rows and 8 columns and 10 offset vectors $b_1^i$, $i \in \{0, \ldots, 9\}$ each of size 16. Matrices and offset vectors of that set are used for blocks of sizes 4×8, 8×4 and 8×8. Finally, the set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64. Matrices and offset vectors of that set or parts of these matrices and offset vectors are used for all other block-shapes.

As shown, given an 8×8 block (2610), MIP takes four averages along each axis of the boundary. The resulting eight input samples enter the matrix vector multiplication. The matrices are taken from the set $S_1$. This yields 16 samples (2621) on the odd positions of the prediction block. Thus, a total of (8·16)/(8·8)=2 multiplications per sample are performed. After adding an offset, these samples are interpolated vertically by using the reduced top boundary samples. Horizontal interpolation follows by using the original left boundary samples. The interpolation process does not require any multiplications in this case.

5.1 Signaling of MIP Mode

In some embodiments, for each Coding Unit (CU) in intra mode, a flag indicating if an MIP mode is applied on the corresponding Prediction Unit (PU) or not can be sent in the bitstream. If an MIP mode is applied, the index predmode of the MIP mode is signaled using an MPM-list including 3 MPMs.

The derivation of the MPMs can be performed using the intra-modes of the above and the left PU as follows. There are three fixed mapping tables map_angular_to_mipid, idx$\in\{0,1,2\}$, and each table associate each conventional intra prediction mode predmode$_{Angular}$ with a specific MIP mode, as described in the following formula.

$$\text{predmode}_{MIP} = \text{map\_angular\_to\_mip}[\text{predmode}_{Angular}]. \quad \text{(Eq. 5)}$$

where map_angular_to_mip is a fixed look-up table. The index of the mapping table is decided based on the width W and height H of PU, and in total three indices are available, as described below, $$\text{idx}(PU) = \text{idx}(W,H) \in \{0,1,2\} \quad \text{(Eq. 6)}$$

that indicates from which of the three sets the MIP parameters are to be taken above.

In some examples, to generate the MPM list for current block which is coded by MIP mode, an above MIP mode, namely mode$_{MIP}^{above}$, and a left MIP mode, namely mode$_{MIP}^{left}$, are firstly derived.

The value of mode$_{MIP}^{above}$ can be derived as follows:

If the above PU PU$_{above}$ is available, and it belongs to the same CTU where the current PU resides, and PU$_{above}$ is coded by MIP using an MIP mode $$\text{predmode}_{MIP}^{above} \text{ and } \text{idx}(PU) = \text{idx}(PU_{above}), \quad \text{(Eq. 7)}$$

$$\text{mode}_{MIP}^{above} = \text{predmode}_{MIP}^{above}. \quad \text{(Eq. 8)}$$

If the above PU PU$_{above}$ is available, and it belongs to the same CTU where the current PU resides, and PU$_{above}$ is coded using a conventional intra prediction mode predmode$_{Angular}^{above}$, $$\text{mode}_{MIP}^{above} = \text{map\_angular\_to\_mip}[\text{predmode}_{Angular}^{above}]. \quad \text{(Eq. 9)}$$

Otherwise, $$\text{mode}_{MIP}^{above} = -1 \quad \text{(Eq. 10)}$$

which means that this mode is unavailable.

The value of mode$_{MIP}^{left}$ is derived in the same way of deriving mode$_{MIP}^{above}$ but without checking whether the left PU belongs to the same CTU where the current PU resides.

Finally, given the derived mode$_{MIP}^{above}$ and mode$_{MIP}^{left}$ and three pre-defined fixed default MPM lists list$_{idx}$, idx$\in\{0, 1, 2\}$ each of which contains three distinct MIP modes, an MPM list is constructed. The MPM list is constructed based on the given default list list$_{idx}$(PU) and mode$_{MIP}^{above}$ and mode$_{MIP}^{left}$, by substituting −1 by default values as well as removing duplicate MIP modes.

As an example, FIG. 27 shows a CU-level syntax table where the flags signaling MIP modes are shown in a frame (2701).

5.2 MPM-List Derivation for Conventional Intra-Prediction Modes

In some embodiments, the MP modes are harmonized with the MPM-based coding of the conventional intra-prediction modes as follows. The luma and chroma MPM-list derivation processes for the conventional intra-prediction modes uses separate fixed tables map_mip_to_angular$_{idx}$, idx$\in\{0,1,2\}$, which map an MIP-mode predmode$_{MIP}$ to one of the conventional intra-prediction modes, $$\text{predmode}_{Angular} = \text{map\_mip\_to\_angular}[\text{predmode}_{MIP}]. \quad \text{(Eq. 11)}$$

where map_mip_to_angular is a fixed look-up table. For the luma MPM-list derivation, whenever a neighboring luma block is coded by an MP mode predmode$_{MIP}$, this block is treated as if it was using the conventional intra-prediction mode predmode$_{Angular}$. For the chroma MPM-list derivation, whenever the current luma block uses an MIP-mode, the same mapping is used to translate the MIP-mode to a conventional intra prediction mode.

III. Implicit Transform Selection Enabling Based on High Level Syntax Elements or Block Level Syntax Elements In some embodiments, two transform coding schemes, implicit transform (or referred to as implicit transform selection) and explicit transform (or referred to as explicit transform selection), can be employed.

In implicit transform, a group of non-DCT2 transforms (e.g., DST-1, DCT-5, DST-7, DCT-8, DST-4, DCT-4) can be selected without transform index signaling. For example, a group of non-DCT2 transforms can be selected using already coded information that is available to both an encoder and a corresponding decoder. The already coded information can include, but not limited to, intra prediction mode (e.g., planar mode, DC mode, angular modes), block size, block width, block height, block aspect ratio, block area size, intra coding mode (e.g., whether multiple reference line (MRL), ISP, MIP is used), position of selected spatial merge candidates (e.g., top merge candidate, left merge candidate), inter prediction mode (e.g., inter position dependent prediction combination (inter-PDPC) mode, combined inter intra prediction (CIIP) mode).

In contrast, in explicit transform, one transform can be selected from a group of transform type candidates (such as DCT-2, DST-1, DCT-5, DST-7, DCT-8, DST-4, DCT-4) with an index signaled to indicate which transform type is selected.

1. Implicit Transform Enabling when Explicit MTS is Disabled

In some embodiments, as described in the section II.3.2, for an intra prediction residual block which is not coded by ISP, implicit transform selection can be enabled when explicit MTS is disabled for both intra and inter prediction residual blocks as indicated by high level syntax (HLS) elements. For example, when SPS syntax elements, sps_explicit_mts_intra_enabled_flag and sps_explicit_mts_inter_enabled_flag, are both 0, a decoder can determine to enable the implicit transform selection for pictures or blocks associated with the SPS syntax elements.

As an example, FIGS. 28A-28B in combination show a text (2800) specifying a transform coding process of performing explicit or implicit transform selection for a current block based on related syntax elements received from a bitstream. The text (2800) can be used as a part of a video coding standard. Two sections (2801) and (2802) are shown in FIG. 28A, and one section (2803) and two tables (2804) and (2805) are shown in FIG. 28B.

In the section (2801), inputs to and output of the transform coding process are described. Specifically, location, size, color component, inverse-quantized transform coefficients of the current block are the inputs, and residual samples after an inverse transform processing using selected transforms are the output.

In the section (2802), derivation of a variable, denoted by implicitMtsEnabled, is described. The variable indicates whether implicit selection is enabled. As described, if an SPS syntax element, sps_mts_enabled_flag, is equal to 1 (which indicates MTS is enabled for pictures or blocks associated with this SPS syntax element), implicitMtsEnabled is equal to 1 when one of the three following conditions is true: (i) an ISP is used for coding the current block; (ii) SBT is enabled and both sides of the current block is smaller or equal to 32, which indicates SBT is used; or (iii) sps_explicit_mts_intra_enabled_flag and sps_explicit_mts_inter_enabled_flag are both equal to 0 (which indicates explicit MTS is disabled for both intra and inter coded blocks), and the current block is intra coded. Otherwise, implicitMtsEnabled is set equal to 0, which indicating implicit transform selection is disabled for the current block.

As described in the section (2802), according to condition (i), for an intra predicted block coded with an ISP mode, implicit transform can be enabled for coding this intra predicted block. According to condition (iii), for an intra predicted block not coded with an ISP mode, when explicit MTS is disabled for both intra and inter predicted blocks, implicit transform can be enabled for coding the intra predicted block not coded with the ISP mode.

In the section (2803), vertical and horizontal transforms are determined according to the variable implicitMtsEnabled, the inputs to the process, and the related syntax elements. For example, when both sps_explicit_mts_intra_enabled_flag and sps_explicit_mts_inter_enabled_flag are equal to 0, the current block (that is of luma component and intra predicted) can be given a horizontal transform kernel (indicated by trTypeHor) and a vertical transform kernel (indicated by trTypeVer) according to expressions (3-1) and (3-2), respectively.

In the tables (2804) and (2805), the numbers 1 and 2 for indicating horizontal or vertical transform kernel types indicate a DST-7 transform and a DCT-8 transform, respectively, while the number 0 indicates a DCT-2 transform. In some examples, DST-4 transforms can be used in place of the DST-7 transforms.

In the examples of FIGS. 28A-28B, for blocks controlled by the HLS elements sps_explicit_mts_intra_enabled_flag and sps_explicit_mts_inter_enabled_flag, explicit MTS for inter coded blocks and implicit transform for intra coded blocks (non-ISP coded) cannot be coexist. However, implicit transform selection on intra prediction residual block does not need to be necessarily dependent on a HLS element (e.g., sps_explicit_mts_inter_enabled_flag) controlling MTS enabling for inter prediction residuals. Thus, in some embodiments, for an intra-coded block which is not predicted by ISP mode, whether implicit transform can be applied depends on whether MTS can be applied for intra prediction residual (e.g., a value of sps_explicit_mts_intra_enabled_flag), but does not depend on whether MTS can be applied for inter prediction residual (a value of sps_explicit_mts_inter_enabled_flag). With such a control mechanism, it is allowed to have inter MTS (explicit MTS applied to an inter predication residual block) and implicit transform (for intra prediction residuals) both enabled simultaneously.

For example, a first and second HLS elements can be received at a decoder. The first and second HLS elements control a same set of pictures or regions (e.g., a vide sequence, a picture, a slice, a tile, and the like) that can include intra coded residual blocks and inter coded residual blocks. The first HLS element indicates whether explicit MTS is enabled or disabled for the respective intra coded residual blocks, while the second HLS element indicates whether explicit MTS is enabled or disabled for the respective inter coded residual blocks. With respect to the term of inter MTS, an explicit MTS applied to an intra coded residual block can be referred to as an intra MTS.

When the first HLS element indicates explicit MTS is disabled for the intra coded residual blocks, the decoder can accordingly determine to enable implicit transform (or implicit MTS) for the intra coded blocks without considering a value of the second HLS element. For example, the second HLS element can be either 0 or 1, which does not affect the enabling of the implicit transform for the intra coded residual block.

As an example, FIG. 29 shows modifications (2900) to the text (2800) that correspond to the implicit transform enabling scheme where implicit transform for intra residual blocks and explicit transform for inter residual blocks can coexist. In the modifications (2900), a removed text is marked with a strikethrough, while an added text is marked with an underline. As shown, the condition of sps_explicit_mts_inter_enabled_flag being 0 has been removed.

2. Implicit Transform Disabling when Other Coding Tools are Enabled

In some embodiments, whether an implicit transform can be applied to an intra coded block (that is not predicted by ISP mode) depends on whether a specific coding tool is enabled as indicate by a HLS element.

2.1 when NSST is Enabled

In an embodiment, an implicit transform can be disabled for an intra coded block (that is not predicted by ISP mode) when a HLS element indicates NSST is enabled. For example, as described in the section II.4.1, the transform matrix T is used in the equation (Eq. 3) for the secondary transform processing. The transform matrix T can include constant elements, and be designed with an assumption of a certain statistics of targeted coefficient blocks, such as coefficient blocks resulting from an explicit transform selection. Thus, a coefficient block resulting from an implicit transform selection may not match with the NSST in terms of statistics of respective coefficients. For example, applying an NSST to results of an implicit transform may not improve coding performance. For the above reason, disabling implicit transform when NSST is enabled may be desirable.

In this disclosure, the term NSST can be used to refer to a family of non-separable secondary transform coding schemes, such as the initial design of NSST, RST, LFNST, or the like.

For example, a decoder may receive two HLS elements: one HLS element (e.g., sps_explicit_mts_intra_enabled_flag) indicates explicit MTS is disabled, while the other HLS element (e.g., sps_lfnst_enabled_flag) indicates an NSST is enabled. Accordingly, the decoder can determine not to enable an implicit transform for intra coded blocks controlled by those two HLS elements. In contrast, if one HLS element indicates explicit MTS is disabled, and the other HLS element indicates an NSST is also disabled, the decoder can determine to enable an implicit transform for respective intra coded blocks.

As an example, FIG. 30 shows modifications (3000) to the text (2800) that correspond to a scenario where an implicit transform is enabled when an NSST is disabled. As shown, an additional restriction, "sps_lfnst_enabled_flag is equal to 0", is added to the condition (iii) for deriving the variable implicitNtsEnabled.

2.2 When MIP is Enabled

Similar to the scenario where an NSST is enabled, in some embodiments, implicit transform is disabled for an intra coded block (that is not predicted by ISP mode) when a HLS element indicates an MIP is enabled. For example, applying an MIP intra coding mode to a block may resulting in a residual block having different statistics from residual blocks coded with regular intra modes. Thus, a residual block coded with MIP may not match with implicit transform which may assume residual statistics resulting from regular intra modes. Therefore, disabling implicit transform may be desirable when an MIP is enabled.

For example, a decoder may receive two HLS elements: one HLS element (e.g., sps_explicit_mts_intra_enabled_flag) indicates explicit MTS is disabled, while the other HLS element (e.g., sps_mip_enabled_flag) indicates an MIP is enabled. Accordingly, the decoder can determine not to enable an implicit transform for intra coded blocks controlled by those two HLS elements. In contrast, if both the explicit MTS and the MIP are disabled as indicated by the two HLS elements, the decoder can determine to enable an implicit transform for respective intra coded blocks.

As an example, FIG. 31 shows modifications (3100) to the text (2800) that correspond to a scenario where an implicit transform is enabled when an MIP is disabled. As shown, an additional restriction, "sps_mip_enabled_flag is equal to 0", is added to the condition (iii) for deriving the variable implicitNtsEnabled.

3. Implicit Transform Enabling Based on Block Level Syntax Element Indications In some embodiments, whether an implicit transform can be applied to an intra coded block (that is not predicted by ISP mode) depends on whether MTS, NSST or MIP is applied to the intra coded block as indicate by block level syntax elements.

3.1 When MTS and NSST are not Applied

In an embodiment, whether implicit transform can be applied to an intra coded block depends on whether both MTS and NSST are not applied to the intra coded block as indicated by block level syntax elements.

For example, a decoder can receive a first and second CU level (or block level) syntax elements associated with a current block that is intra coded and not predicted by ISP mode. The current block may be located at a position of coordinates [x0] [y0] within a picture.

The first CU level syntax element (e.g., tu_mts_idx[x0][y0]) may indicate DCT-2 transforms can be used for the current block instead of transforms used in MTS (e.g., DST-7, DCT-8, DCT-4, or the like). As an example, in the table (2804), when tu_mts_idx[x0] [y0] has a value of 0, the variables of trTypeHor and trTypeVer both have a value of 0, which indicates the horizontal and vertical transforms are DCT-2 transforms, and no DST-7 or DCT-8 transforms are applied. The second CU level syntax element (e.g., lfnst_idx [x0] [y0] may indicate NSST is not applied to the current block. Based on the above first and second CU level syntax elements, the decoder can determine to enable an implicit MTS for the current block.

In contrast, if the first and second CU level syntax elements indicate MTS is applied (tu_mts_idx[x0] [y0] has a value of 1, 2, 3, or 4), or NSST is applied (lfnst_idx [x0][y0] has a non-zero value), the decoder can determine to disable an implicit MTS.

As an example, FIG. 32 shows modifications (3200) to the text (2800) that correspond to a scenario where both MTS and NSST are not applied to a current block. As shown, the original condition (iii) in the text (2800) is replaced with a condition that two CU level syntax elements "tu_mts_idx [x0][y0] and lfnst_idx[x0][y0] are both equal to 0".

3.2 When MTS, NSST, and MIP are not Applied

In an embodiment, whether implicit transform can be applied to an intra coded block depends on whether MTS, NSST, and MIP are not applied to the intra coded block as indicated by block level syntax elements. Compared with the section III.3.1, one more coding tool, MIP, is additionally considered.

For example, a decoder can receive a first, second, and third CU level (or block level) syntax elements associated with a current block that is intra coded and not predicted by ISP mode. The current block may be located at a position of coordinates [x0] [y0] within a picture.

The first CU level syntax element (e.g., tu_mts_idx[x0] [y0]) may indicate DCT-2 transforms can be used for the current block instead of transforms used in MTS. The second CU level syntax element (e.g., lfnst_idx [x0] [y0]) may indicate NSST is not applied to the current block. The third CU level syntax element (e.g., tu_mip_flag) may indicate MIP is not applied to the current block. Based on the above three CU level syntax elements, the decoder can determine to enable an implicit MTS for the current block.

In contrast, if the above three CU level syntax elements indicate MTS is applied (tu_mts_idx[x0][y0] has a value of 1, 2, 3, or 4), NSST is applied (lfnst_idx [x0] [y0] has a non-zero value), or MIP is applied (tu_mip_flag has a value of 1), the decoder can determine to disable an implicit MTS.

As an example, FIG. 33 shows modifications (3300) to the text (2800) that correspond to a scenario where none of MTS, NSST, or MIP is applied to a current block. As shown, the original condition (iii) in the text (2800) is replaced with a condition that three CU level syntax elements "tu_mts_idx [x0][y0], intra_mip_flag[x0][y0] and lfnst_idx[x0][y0] are all equal to 0".

4. Examples of Transform Coding Processes

Figure 35:
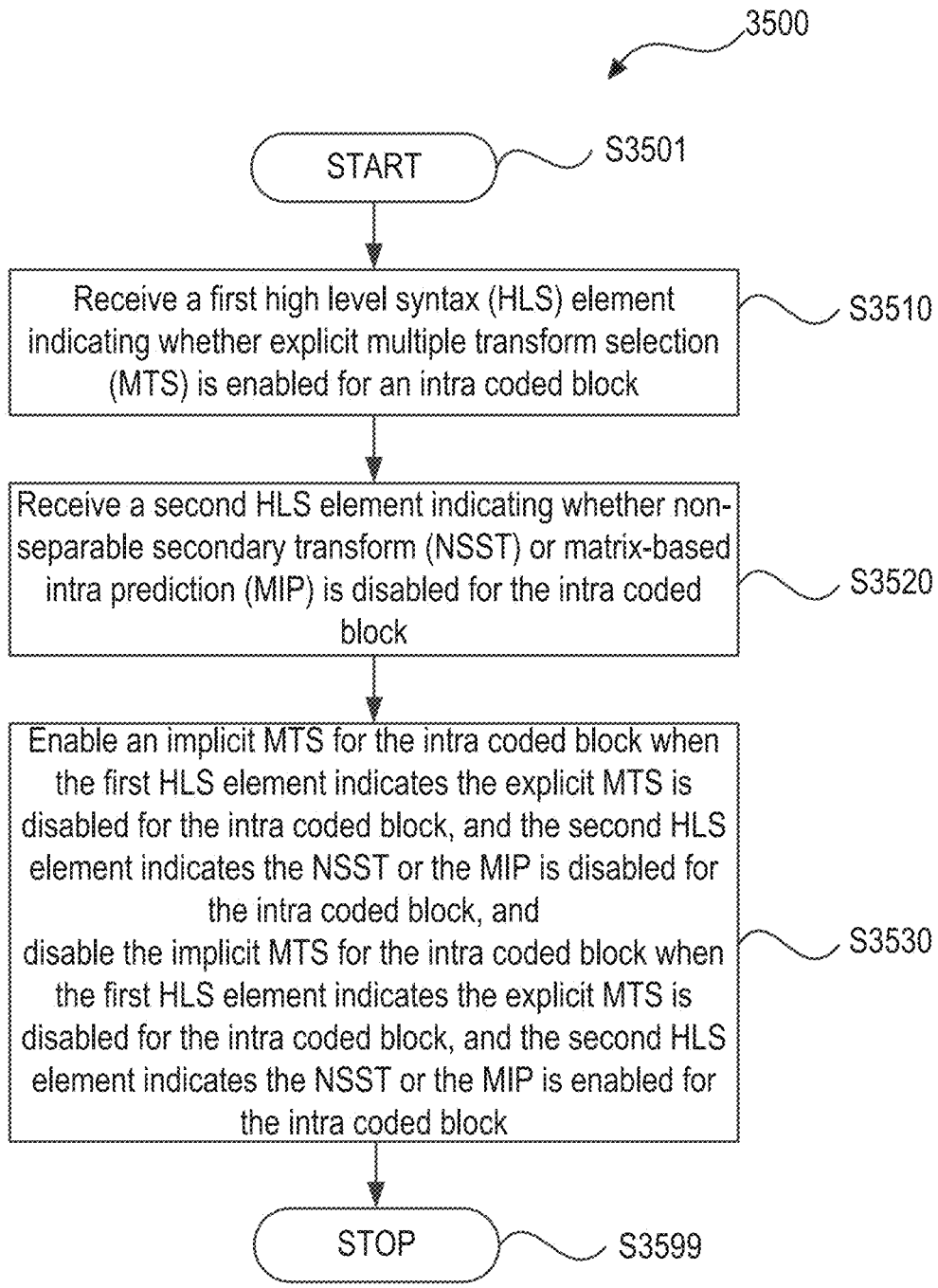
Figure 36:
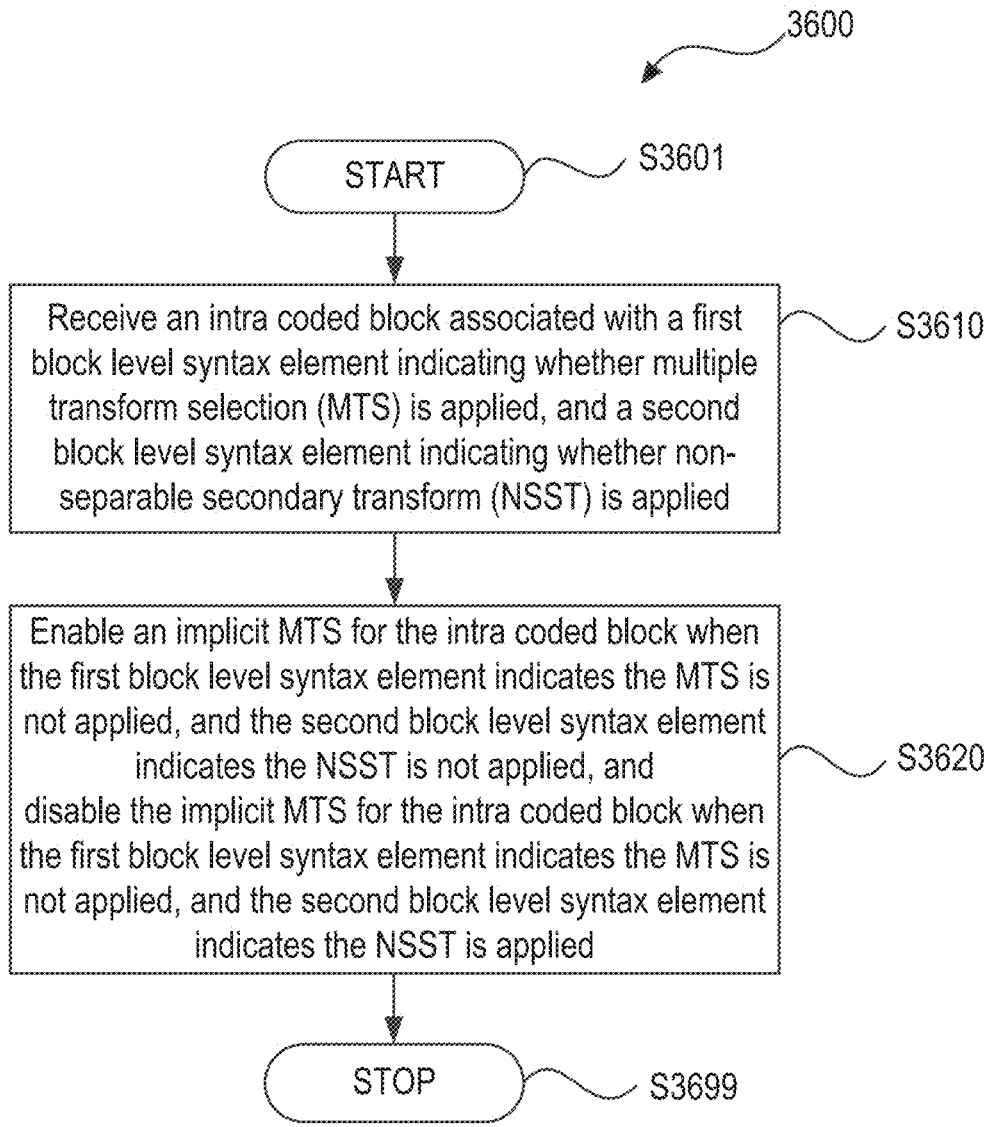

FIGS. 34-36 show flow charts of transform coding processes (3400), (3500), and (3600) according to some embodiments of the disclosure. The processes (3400), (3500), and (3600) can be used in inverse transform processing at a decoder to generate a residual block for a block under reconstruction. In various embodiments, the processes (3400), (3500), and (3600) can be executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the processes (3400), (3500), and (3600) can be implemented in software instructions, thus when the processing circuitry executes the software instructions, the processing circuitry performs the processes (3400), (3500), and (3600).

4.1 the Process (3400): Implicit Transform Enabling when Explicit MTS is Disabled The process (3400) starts from (S3401), and proceeds to (S3410).

At (S3410), a first HLS element is received at a decoder. The first HLS element can indicate whether an explicit MTS is disabled for an intra coded block. For example, the intra coded block is under reconstruction, and thus can be referred to as a currant block. The first HLS element may be associated with a set of coding blocks that include the current block.

At (S3420), a second HLS element is received at the decoder. The second HLS element can indicate whether an explicit MTS is enabled for an inter coded block. For example, the second HLS element can be associated with the same set of coding blocks as the first HLS element. Both the current block and the inter coded block are included in the set of coding blocks.

At (S3430), the decoder can determine to enable implicit MTS for the current block when the first HLS element indicates the explicit MTS is disabled for the intra coded block, and the second HLS element indicates the explicit MTS is enabled for the inter coded block. The process (3400) can proceed to (S3499), and terminates at (S3499).

4.2 the Process (3500): Implicit Transform Disabling when Other Coding Tools are Enabled The process (3500) starts from (S3501), and proceeds to (S3510).

At (S3510), a first HLS element is received at a decoder. The first HLS element can indicate whether an explicit MTS is enabled for an intra coded block. The intra coded block can be a block under reconstruction. The first HLS element controls a set of coding blocks including the intra coded block.

At (S3520), a second HLS element is received at the decoder. The second HLS element can indicate whether an NSST or MIP is disabled for the intra coded block. For example, the second HLS element can control the same set of coding blocks as the first HLS element.

At (S3530), the decoder can determine whether to enable an implicit MTS for processing the intra coded block based on the first and second HLS elements. For example, the decoder can determine to enable the implicit MTS for the intra coded block when the first HLS element indicates the explicit MTS is disabled for the intra coded block, and the second HLS element indicates the NSST or the MIP is disabled for the intra coded block. Alternatively, the decoder can determine to disable the implicit MTS for the intra coded block when the first HLS element indicates the explicit MTS is disabled for the intra coded block, but the second HLS element indicates the NSST or the MIP is enabled for the intra coded block. The process (3500) can proceed to (S3599), and terminates at (S3599).

4.3 the Process (3600): Implicit Transform Enabling Based on Block Level Syntax Element Indications The process (3600) starts from (S3601), and proceeds to (S3610).

At S(3610), an intra coded block is received at a decoder. The intra coded block can be associated with a first block level syntax element indicating whether an MTS is applied, and a second block level syntax element indicating whether an NSST is applied. For example, the intra coded block belongs to a CU that includes CU level syntax elements including the first and second block level syntax elements.

At (S3620), the decoder can determine whether to enable an implicit MTS for the intra coded block based on the first and second block level syntax elements. For example, the decoder can determine to enable the implicit MTS for the intra coded block when the first block level syntax element indicates the MTS is not applied, and the second block level syntax element indicates the NSST is not applied. Alternatively, the decoder can determine to disable the implicit MTS for the intra coded block when the first block level syntax element indicates the MTS is not applied, but the second block level syntax element indicates the NSST is applied. The process (3600) can proceeds to (S3699), and terminates at (S3699).

IV. Computer System

The techniques described above, can be implemented as computer software using computer-readable instructions and physically stored in one or more computer-readable media. For example, FIG. 37 shows a computer system (3700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 37:
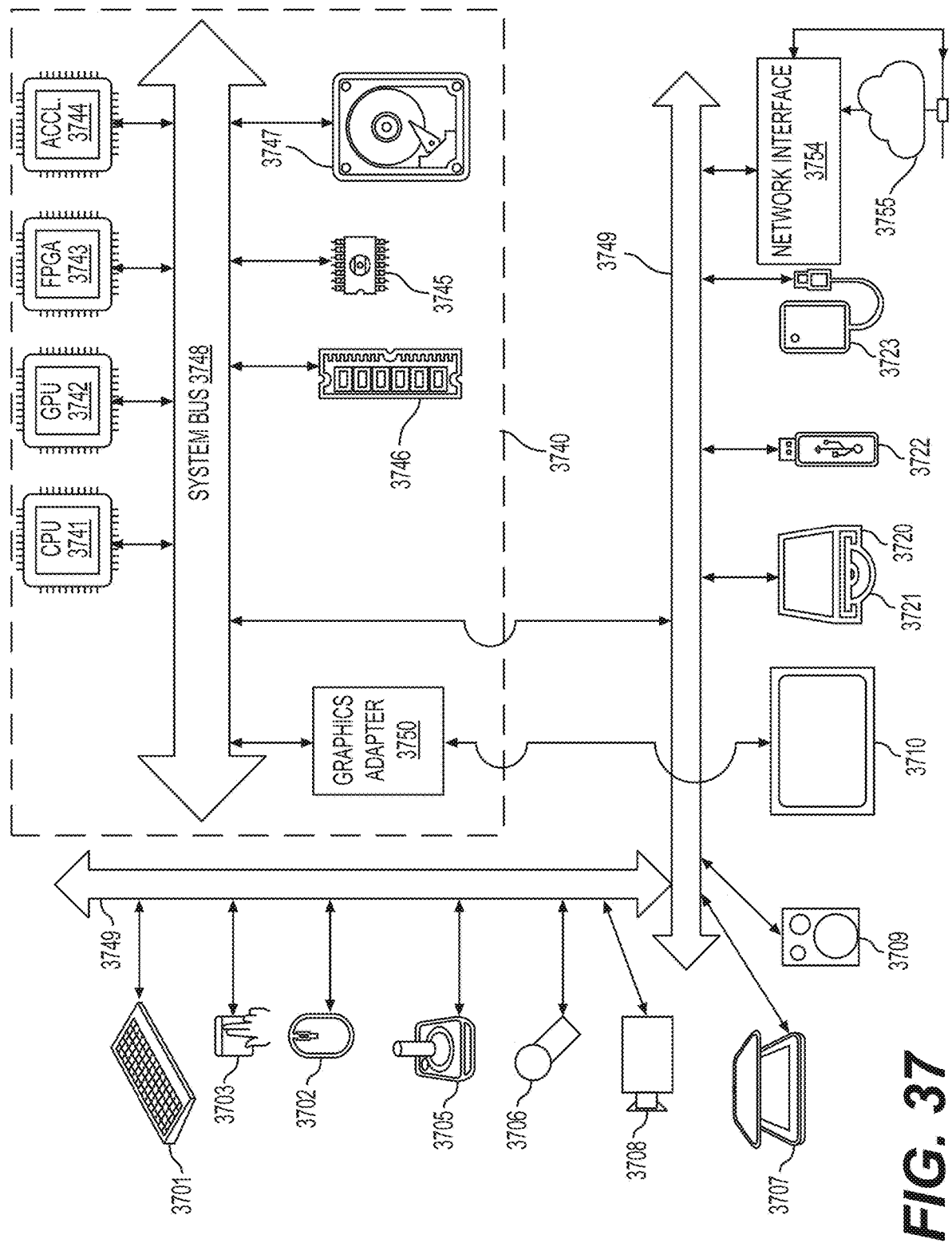
FIG. 37 is a schematic illustration of a computer system in accordance with an embodiment.

The components shown in FIG. 37 for computer system (3700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3700).

Computer system (3700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3701), mouse (3702), trackpad (3703), touch screen (3710), data-glove (not shown), joystick (3705), microphone (3706), scanner (3707), camera (3708).

Computer system (3700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3710), data-glove (not shown), or joystick (3705), but there can also be tactile feedback devices that do not serve as input devices), audio output devices (such as: speakers (3709), headphones (not depicted)), visual output devices (such as screens (3710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (3700) can also include human accessible storage devices and their associated media such as optical media including CD/DVD ROM/RW (3720) with CD/DVD or the like media (3721), thumb-drive (3722), removable hard drive or solid state drive (3723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (3749) (such as, for example USB ports of the computer system (3700)); others are commonly integrated into the core of the computer system (3700) by attachment to a system bus as described below (for example Ethernet interface into a PC computer system or cellular network interface into a smartphone computer system). Using any of these networks, computer system (3700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3740) of the computer system (3700).

The core (3740) can include one or more Central Processing Units (CPU) (3741), Graphics Processing Units (GPU) (3742), specialized programmable processing units in the form of Field Programmable Gate Areas (FPGA) (3743), hardware accelerators for certain tasks (3744), and so forth. These devices, along with Read-only memory (ROM) (3745), Random-access memory (3746), internal mass storage such as internal non-user accessible hard drives, SSDs, and the like (3747), may be connected through a system bus (3748). In some computer systems, the system bus (3748) can be accessible in the form of one or more physical plugs to enable extensions by additional CPUs, GPU, and the like. The peripheral devices can be attached either directly to the core's system bus (3748), or through a peripheral bus (3749). Architectures for a peripheral bus include PCI, USB, and the like.

CPUs (3741), GPUs (3742), FPGAs (3743), and accelerators (3744) can execute certain instructions that, in combination, can make up the aforementioned computer code. That computer code can be stored in ROM (3745) or RAM (3746). Transitional data can be also be stored in RAM (3746), whereas permanent data can be stored for example, in the internal mass storage (3747). Fast storage and retrieve to any of the memory devices can be enabled through the use of cache memory, that can be closely associated with one or more CPU (3741), GPU (3742), mass storage (3747), ROM (3745), RAM (3746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3700), and specifically the core (3740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3740) that are of non-transitory nature, such as core-internal mass storage (3747) or ROM (3745). The software implementing various embodiments of the present disclosure can be stored in such devices and executed by core (3740). A computer-readable medium can include one or more memory devices or chips, according to particular needs. The software can cause the core (3740) and specifically the processors therein (including CPU, GPU, FPGA, and the like) to execute particular processes or particular parts of particular processes described herein, including defining data structures stored in RAM (3746) and modifying such data structures according to the processes defined by the software. In addition or as an alternative, the computer system can provide functionality as a result of logic hardwired or otherwise embodied in a circuit (for example: accelerator (3744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

AMT: Adaptive Multiple Transform
ASIC: Application-Specific Integrated Circuit
BMS: benchmark set
CANBus: Controller Area Network Bus
CCLM: Cross-Component Linear Model
CD: Compact Disc
COT: Compound Orthonormal Transform
CPUs: Central Processing Units
CRT: Cathode Ray Tube
CTBs: Coding Tree Blocks
CTUs: Coding Tree Units
CU: Coding Unit
DVD: Digital Video Disc
EMT: Enhanced Multiple Transform
FPGA: Field Programmable Gate Areas
GOPs: Groups of Pictures
GPUs: Graphics Processing Units
GSM: Global System for Mobile communications
HDR: high dynamic range
HEVC: High Efficiency Video Coding
HLS: High-Level Syntax
HRD: Hypothetical Reference Decoder
IBC: Intra Block Copy
IC: Integrated Circuit
IDT: Identity transform
ISP: Intra Sub-Partitioning
JEM: joint exploration model
JVET: Joint Video Exploration Team
KLT: Karhunen-Loeve Transform
LAN: Local Area Network
LCD: Liquid-Crystal Display
LFNST: Low-Frequency Non-Separable Secondary Transform
LTE: Long-Term Evolution
MIP: Matrix-based Intra Prediction Mode
MRL (or MRLP): Multiple reference line prediction
MTS: Multiple Transform Selection
MV: Motion Vector
NSST: Non-Separable Secondary Transform
OLED: Organic Light-Emitting Diode
PBs: Prediction Blocks
PCI: Peripheral Component Interconnect
PLD: Programmable Logic Device
PPS: Picture Parameter Set
PU: Prediction Unit
RAM: Random Access Memory
ROM: Read-Only Memory
RST: Reduced-Size Transform
SBT: Sub-block Transform
SDR: standard dynamic range
SEI: Supplementary Enhancement Information
SNR: Signal Noise Ratio
SPS: Sequence Parameter Set
SSD: solid-state drive
SVT: Spatially Varying Transform
TSM: Transform Skip Mode
TUs: Transform Units,
USB: Universal Serial Bus
VPS: Video Parameter Set
VUL: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding at a video decoder, comprising:
    receiving a first high level syntax (HLS) element indicating whether an explicit multiple transform selection (MTS) is enabled or disabled for a first block that is an intra coded block, wherein transform type information indicating a transform type is derived in the explicit MTS;
    receiving a second HLS element indicating whether the explicit MTS is enabled or disabled for a second block that is an inter coded block, wherein the first and second HLS elements control a same set of coding blocks that include the first block and the second block; and
    enabling an implicit MTS for the first block when the first HLS element indicates the explicit MTS is disabled for the first block without considering whether the second HLS element indicates the explicit MTS is enabled or disabled for the second block, wherein no transform type information is signaled by the implicit MTS.

2. The method of claim 1, further comprising:
    applying the implicit MIS to the intra coded block, wherein a transform type for processing the intra coded block is determined according to a size of the intra coded block.

3. The method of claim 1, wherein the first or second HLS element is one of:
    a video parameter set (VPS) syntax element,
    a sequence parameter set (SPS) syntax element,
    a picture parameter set (PPS) syntax element,
    a slice header syntax element,
    a tile header syntax element, or
    a tile group header syntax element.

4. The method of claim 1, wherein the intra coded block is not coded with an intra sub-partitioning (ISP) mode.

5. The method of claim 1, further comprising:
    receiving a third HLS element indicating an MTS is enabled for each of the inter and intra coded blocks.

6. The method of claim 1, wherein the transform type information is derived based on an MTS index signaled in the explicit MTS.

7. A method of video decoding at a video decoder, comprising:
    receiving a first high level syntax (HLS) element indicating whether an explicit multiple transform selection (MTS) is enabled or disabled for an intra coded block, wherein transform type information indicating a transform type is derived in the explicit MTS;
    receiving a second HLS element indicating whether a non-separable secondary transform (NSST) or matrix-based intra prediction (MIP) is disabled or enabled for the intra coded block; and
    enabling an implicit MTS for the intra coded block when both a first condition and a second condition are satisfied, the first condition being the first HLS element indicates the explicit MTS is disabled for the intra coded block, the second condition being the second HLS element indicates the NSST or the MIP is disabled for the intra coded block, wherein no transform type information is signaled by the implicit MTS.

8. The method of claim 7, further comprising:
disabling the implicit MTS for the intra coded block when the first HLS element indicates the explicit MTS is disabled for the intra coded block, and the second HLS element indicates the NSST or the MIP is enabled for the intra coded block.

9. The method of claim 7, wherein the enabling includes:
enabling the implicit MTS for the intra coded block when the first HLS element indicates the explicit MTS is disabled for the intra coded block, and both the NSST and the MIP are disabled for the intra coded block as indicated by the second HLS element and a third HLS element, respectively.

10. The method of claim 7, further comprising:
applying the implicit MTS to the intra coded block.

11. The method of claim 7, wherein the first or second HLS element is one of:
a video parameter set (VPS) syntax element,
a sequence parameter set (SPS) syntax element,
a picture parameter set (PPS) syntax element,
a slice header syntax element,
a tile header syntax element, or
a tile group header syntax element.

12. The method of claim 7, wherein the intra coded block is not coded with an intra sub-partitioning (ISP) mode.

13. The method of claim 7, wherein the transform type information is derived based on an MTS index signaled in the explicit MTS.

14. A method of video decoding at a video decoder, comprising:
receiving an intra coded block associated with a first block level syntax element indicating whether a multiple transform selection (MTS) is applied, and a second block level syntax element indicating whether a non-separable secondary transform (NSST) is applied; and
enabling an implicit MIS for the intra coded block when both a first condition and a second condition are satisfied, the first condition being that the first block level syntax element indicates the MIS is not applied, the second condition being that the second block level syntax element indicates the NSST is not applied, wherein no transform type information is signaled by the implicit MTS.

15. The method of claim 14, further comprising:
disabling the implicit MTS for the intra coded block when the first block level syntax element indicates the MTS is not applied, and the second block level syntax element indicates the NSST is applied.

16. The method of claim 14, wherein the intra coded block is associated with a third block level syntax element indicating whether a matrix-based intra prediction (MIP) is applied, and
the enabling further includes enabling the implicit MTS for the intra coded block when the first block level syntax element indicates the MTS is not applied, the second block level syntax element indicates the NSST is not applied, and the third block level syntax element indicates the MIP is not applied.

17. The method of claim 16, further comprising:
disabling the implicit MTS for the intra coded block when the first block level syntax element indicates the MTS is not applied, and either the second block level syntax element indicates the NSST is applied or the third block level syntax element indicates the MIP is applied.

18. The method of claim 14, wherein the first block level syntax element indicates the MTS is not applied by indicating DCT-2 transforms are to be used for processing the intra coded block.

19. The method of claim 14, further comprising:
applying the implicit MTS to the intra coded block.

20. The method of claim 14, wherein the intra coded block is not coded with an intra sub-partitioning (ISP) mode.

* * * * *